(12) United States Patent
Brittain et al.

(10) Patent No.: US 7,035,807 B1
(45) Date of Patent: Apr. 25, 2006

(54) SOUND ON SOUND-ANNOTATIONS

(76) Inventors: John W. Brittain, 20380 Wolcot Way, Saratoga, CA (US) 95070; Thomas J. Eccles, 8881 Wine Valley Cir., San Jose, CA (US) 95135

( * ) Notice: Subject to any disclaimer, the term of this patent is extended or adjusted under 35 U.S.C. 154(b) by 827 days.

(21) Appl. No.: 10/092,965

(22) Filed: Feb. 19, 2002

(51) Int. Cl.
*G10L 11/00* (2006.01)

(52) U.S. Cl. .................... 704/278; 704/7; 704/201
(58) Field of Classification Search ........... 704/201, 704/278, 7
See application file for complete search history.

(56) References Cited

U.S. PATENT DOCUMENTS

| | | | | |
|---|---|---|---|---|
| 4,841,387 A | * | 6/1989 | Rindfuss | 360/72.1 |
| 5,220,611 A | * | 6/1993 | Nakamura et al. | 704/278 |
| 5,297,249 A | * | 3/1994 | Bernstein et al. | 715/854 |
| 5,655,058 A | * | 8/1997 | Balasubramanian et al. | 704/255 |
| 5,659,662 A | * | 8/1997 | Wilcox et al. | 704/245 |
| 5,732,216 A | | 3/1998 | Logan et al. | |
| 5,742,736 A | * | 4/1998 | Haddock | 704/270 |
| 5,842,170 A | | 11/1998 | Daberko et al. | |
| 5,893,900 A | * | 4/1999 | Matthews | 704/200 |
| 5,970,455 A | * | 10/1999 | Wilcox et al. | 704/270 |
| 6,222,909 B1 | * | 4/2001 | Qua et al. | 379/88.22 |
| 6,389,434 B1 | * | 5/2002 | Rivette et al. | 715/512 |
| 6,397,181 B1 | * | 5/2002 | Li et al. | 704/256.4 |
| 6,404,856 B1 | * | 6/2002 | Wilcox et al. | 379/67.1 |
| 6,606,374 B1 | * | 8/2003 | Rokoff et al. | 379/88.16 |
| 2002/0099552 A1 | * | 7/2002 | Rubin et al. | 704/270 |

* cited by examiner

*Primary Examiner*—Tālivaldis Ivars Šmits
*Assistant Examiner*—Minerva Rivero

(57) ABSTRACT

A Sound on Sound-Annotations (SOS-A) system facilitates the collection, categorization, and retrieval of streams of sound. A stream of sound is captured and annotations of sound concerning the stream of sound are generated for positions of interest or relevancy. The annotations add additional information concerning the stream of sound at the points of interest. Markers of sound are logically or physically inserted in the stream of sound to identify the locations associated with the annotations of sound. The markers of sound point to or link the annotation of sound. The annotations of sound are also captured and can convey any information desired; for example, add description, provide evidence, challenge the validity, ask questions, etc. Any form or frequency of sound can be utilized with the stream of sound, the marker of sound, and/or the annotations of sound.

27 Claims, 15 Drawing Sheets

SOUND ON SOUND-ANNOTATIONS

CROSS-REFERENCE TO RELATED APPLICATIONS

Not applicable.

BACKGROUND

1. Field of Invention

This invention relates to sound, specifically to sound recordings which may be provided with annotations to improve communication and/or collaboration.

2. Description of Prior Art

The quality and effectiveness of communication and collaboration are very significant in business and industry. Communication, whether it be within large entities, between groups, or between individuals, continues to be extremely important. Because of increased usage of teams of personnel, which can be either local or dispersed, inter-personal communication and collaboration are becoming critical to business success.

The Internet

When an Internet web site is accessed, typically a home page is first displayed. On the home page there are usually links to additional information, which users can access if they desire additional information. Such access is typically accomplished by moving a mouse pointer over the top of the link and clicking the left mouse button. The information provided by the link is then displayed on the screen. The Internet typically takes advantage of text or graphic linking mechanisms only, so the user must notice and click the link and may miss it if the user is not alert.

The design of and the information in the web pages and the links to other web pages are currently and typically developed and implemented by skilled information systems personnel. The user of the Internet is not normally involved with the creation of the information, the design of the presentation of the information, or the loading of the information onto the web site. The Internet user either accesses the information to gain knowledge or enters information into previously designed web pages, e.g., to order a book from a retail web site. Internet technology does not allow users to easily add information to a web page or provide additional web pages for access by other users.

Telephone Menus and Forwarded Messages

When a customer calls a company for information to solve a problem, or to register a complaint, the customer typically reaches the company's "Call Center". Before the customer talks to a person, the customer typically is presented with a telephone menu. An example of a telephone menu presentation occurs when a customer calls a company regarding service on a product. The customer is given a series of options and these options may lead to other sets of options. Hopefully, the customer is finally able to obtain the information being sought. Typically, with such telephone menus, significant information is not offered to the caller until the caller arrives at the desired level. The main object of the menu is to provide the caller information which will satisfy the caller's requirement. At this level the caller is able to: 1) hear the desired information, for example, hours of operation, 2) enter required information, for example, leave a message to have their newspaper stopped because they are going on vacation, or 3) talk to a customer representative. The telephone menus do not typically provide useful information at each level of the menu, other than information for accessing the desired next level. The caller may be required to traverse several levels in a menu before receiving value from the call.

Telephone message systems are similar to E-mail in that a message can be passed to someone else with the original message attached at the end. If they are routed to several people or sent back and forth between people, the attached messages can become quite long, complex, and cumbersome, and confusion, ambiguity, and/or lack of understanding can result.

Prior-Art—Patents

U.S. Pat. No. 5,732,216, to Logan, Goessling, and Call (Mar. 24, 1998), titled "Audio Message Exchange System", describes an audio program and message distribution system which includes the organization and transmission of audio recordings, consisting of program segments, to client subscriber locations. It includes a description for appending an audio annotation to an audio recording. The audio recording consists of program segments, i.e., different subjects that are strung together to form the audio recording according to the interests of the subscribers. The patent teaches only how to append audio annotations to a program segment. Since the program segment can be long or complex, confusion, ambiguity, and/or lack of understanding can result.

U.S. Pat. No. 5,842,170, to Daberko, Davis, and Bridgewater (Nov. 24, 1998), titled "Method of Editing in a Hand Held Recorder", focuses on editing messages utilizing a hand-held recorder. It teaches how to insert a second message segment within another message. This allows a user to playback the original message with the inserted message segment, i.e., a composite message. The user's options are limited because they must listen to the composite message; the user does not have the option of selecting whether the user wants to listen to just the inserted message or not.

OBJECTS AND ADVANTAGES

Accordingly, several objects and advantages of our invention are:

a) to improve the speed, timeliness, quality, efficiency, and completeness of communication and/or collaboration;

b) to facilitate and enhance collaboration between and among people, devices, processes, systems, and/or machines;

c) to enable archiving and retrieval of communication and/or collaboration information;

d) to facilitate creation, distribution and management of streams of sound and annotations of sound;

e) to selectively playback an annotation of sound that is linked to a relevant place in an original stream of sound; and f) to provide for an unlimited number of levels of the nesting of annotations of sound.

Further objects and advantages will become apparent from a consideration of the drawings and ensuing description.

SUMMARY

In accordance with the invention we provide a system for the collection, categorization, and retrieval of streams of sound. Once the stream of sound has been captured, annotations of sound concerning the stream of sound can be added at positions of interest or relevancy. A marker of sound is logically or physically inserted in the stream of sound to identify the location of the annotation of sound. The marker of sound points to or links with the annotation, which adds additional information concerning the stream of sound at the point of interest. The annotation is also captured and can convey any information desired for example, to add a description, provide evidence, challenge the validity, ask questions, etc. Any form or frequency of sound can be utilized with the stream of sound, the marker of sound, and/or the annotations of sound.

Our system has the capabilities of:

a) capturing, archiving, categorizing, and retrieval of streams of sound, markers of sound, and annotations of sound;
b) adding and maintaining streams of sound and annotations of sound to streams of sound;
c) providing support for sound within the range of human hearing and below and above the range of human hearing;
d) providing security and access control of streams of sound, markers of sound, and annotations of sound;
e) providing support for wire or wireless operations;
f) nesting of annotations of sound;
g) providing selective playback of the annotations of sound;
h) providing triggers for automated processing;
i) providing predefined sound clips and provision for adding other sound clips;
j) distributing of and/or accessing to streams of sound, markers of sound, and annotations of sound to a selected or a wide group of people, devices, processes, systems, and/or machines;
k) providing system operations, including a rich set of user commands, via voice, keyboard, and or keypad for operations by the application user;
l) providing support for wire and/or wireless communication and/or collaboration devices such as telephones, Personal Digital Assistants (PDAs), Personal Computers (PCs), and any other devices which meet the criteria for user access to the system;
m) providing the technology base (streams of sound and annotations of sound, etc.) for new applications based on the usage of sound (human audible and non-audible), for example an information service utilizing invention capabilities;
n) providing system tailoring and administration, including multiple levels of profiles, to meet the diverse communication and/or collaboration needs across companies, subscribers, locations, departments, groups, and/or individuals; and
o) providing interfaces supporting related technology, for example encryption, translating sound to/from text, etc.

DRAWINGS—FIGURES

DRAWINGS—REFERENCE NUMERALS

50 Sound Stream
52 Sound Glyph
54 Sound Annotation
56 Sound Header
58 Sound Glyph Code
100 Computer Complex
102 Communication Facility
104 User Device
106 Application Program
108 Application Database
110 Application Profile
112 Map Graphic
114 Application Reports
116 User Interface
118 Telephone Microphone
120 Telephone Speaker
122 Telephone Keypad

DETAILED DESCRIPTION—PREFERRED EMBODIMENT

Figure 1:
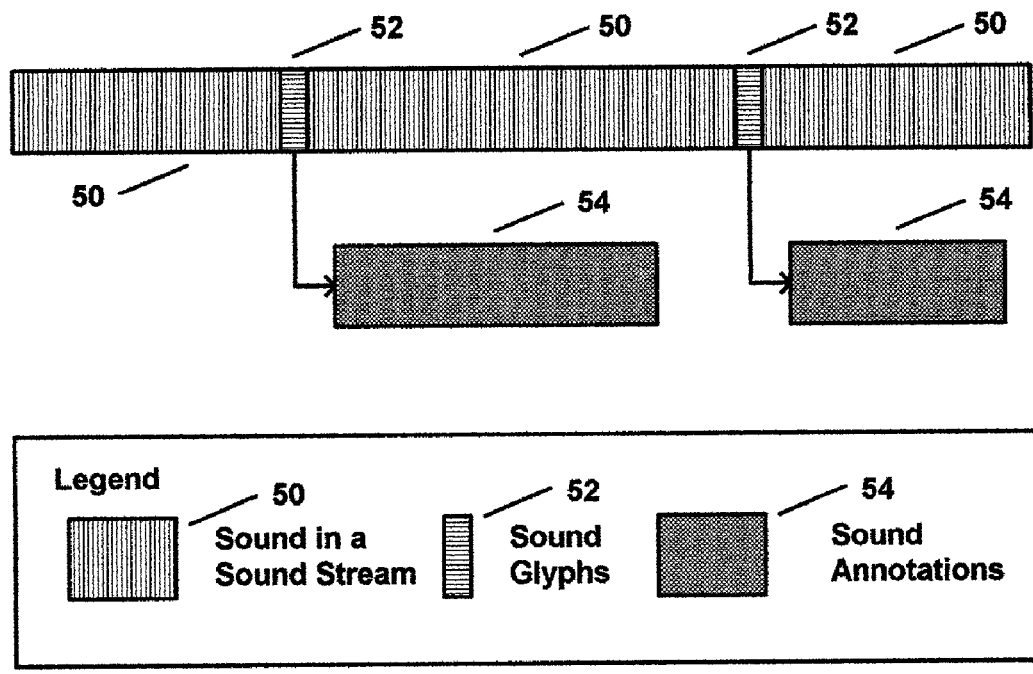
FIG. 1 shows a diagram of a stream of sound with markers of sound inserted and pointing to annotations of sound, in accordance with our invention.

FIG. 1—Sound Stream, Sound Glyph, and Associated Sound Annotation

Our invention, titled "Sound on Sound-Annotations" is referred in this document by the initialism "SOS-A". A stream of sound or sound stream 50 (FIG. 1) is a continuous recording of sound of any length, either analog or digital, that has been cataloged according to our SOS-A system. It consists of:

a) Audible sound, i.e., any sound that is capable of being heard by the human ear, and/or b) Inaudible sound, i.e., any sound that is either below or above the frequency of sound that is capable of being heard by the human ear.

Sound stream 50 has two sound markers or sound glyphs 52 inserted and two connected associated sound annotations 54.

Each sound glyph 52 is a marker of sound or a sound symbol which imparts information to a person, instrument, system and/or machine. Sound glyph 52:

a) marks the position in sound stream 50 for associated sound annotation 54 and is the pointer or link to annotation 54;

b) can be of any duration, but in practice is relatively short; and c) can consist of distinctive audible sound (for example: music, beeps or tones, names, dates, or any other audible sound) or any inaudible sound. For example, sound glyph 52 can be a recording of a piano playing the musical note "middle C" and lasts for 0.5 second.

Figure 7:
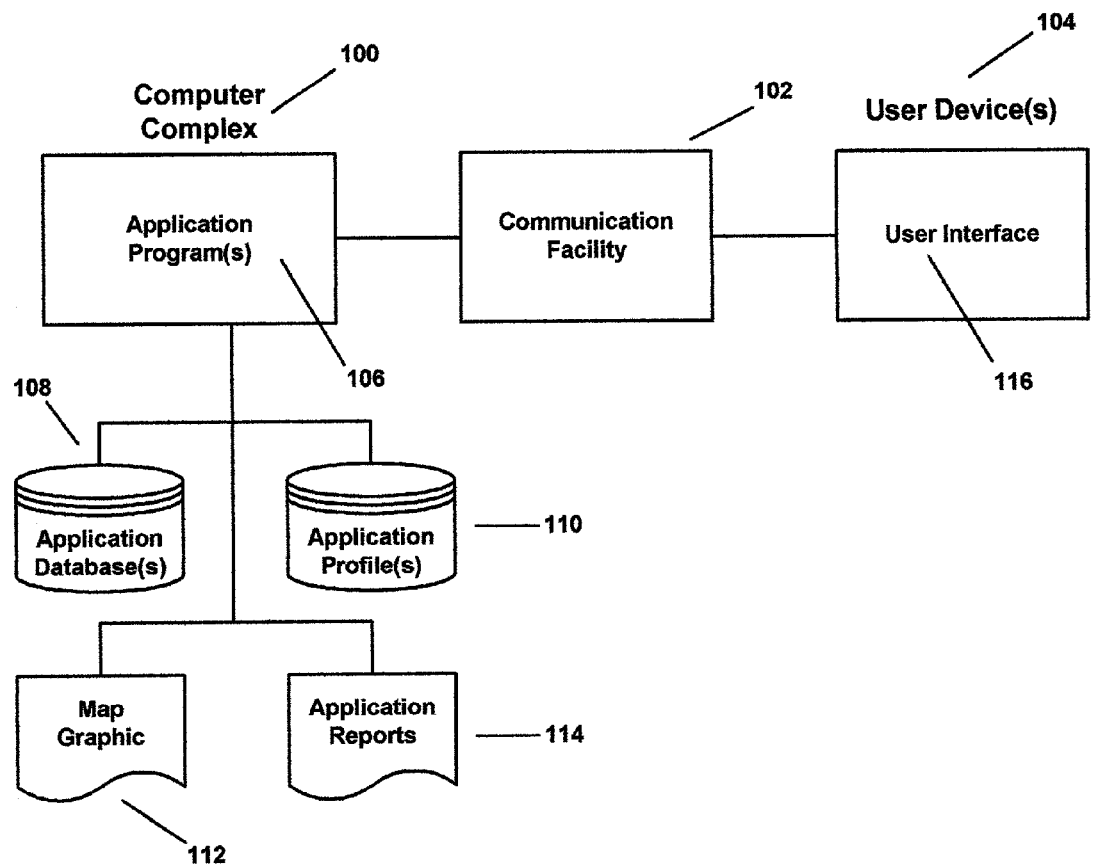
FIG. 7 shows an environment in which the system is used.

Sound glyph 52 is inserted in sound stream 50 at the relevant position to the content of the sound in sound stream 50. Once sound glyph 52 is added to sound stream 50, associated sound annotation 54 is created and linked with appropriate sound glyph 52, and is then cataloged and stored in an application database 108 (FIG. 7). Sound glyph 52 thus provides a link to sound annotation 54. Annotation 54 consists or any audible or inaudible sound; it adds information or requests information associated with the position of sound glyph 52 in sound stream 50. Annotation 54 is itself a sound stream and is similar to sound stream 50.

Glyphs 52 with their associated sound annotations 54 are added at two points of interest or relevancy in sound stream 50. Glyphs 52 can be positioned anywhere in sound stream 50—at the beginning, at the end, or anywhere in between. Glyph 52 is inserted in stream 50 by an application program 106 (FIG. 7) using functionality provided by a database, as described in the section "System Environment" below. Additional information concerning the insertion of glyphs 52 in stream 50 is provided in the section "FIG. 15—Creating Sound Glyphs and the Associated Sound Annotations."

Once sound annotations 54 are cataloged and stored in an application database 108 (FIG. 7), they are available for additional processing, for example, playback, distribution, etc.

Figure 2:
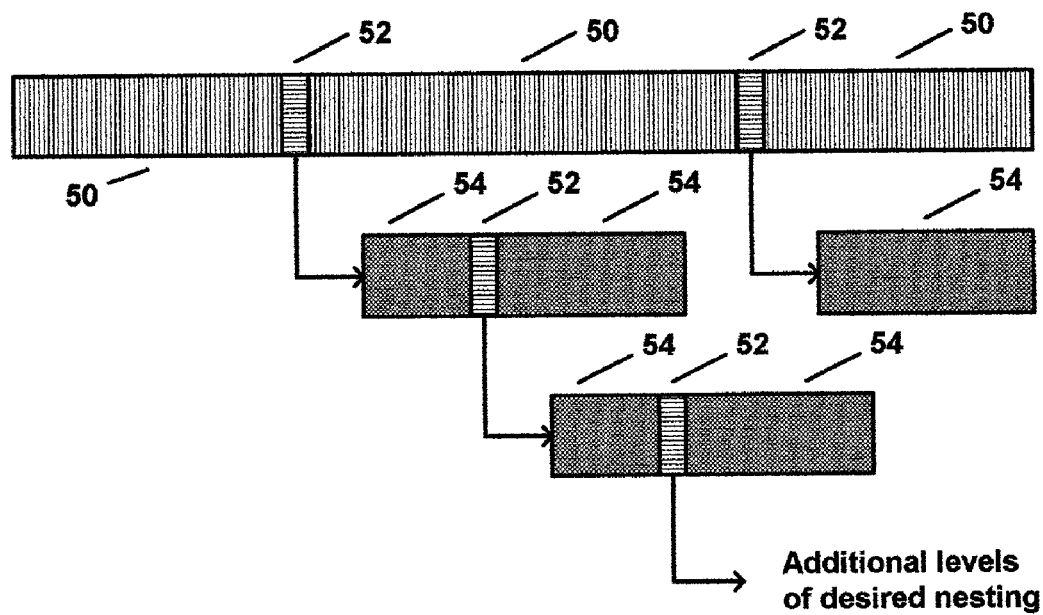
FIG. 2 is a diagram illustrating the nesting of annotations of sound as described in FIG. 1.
Figure 5:
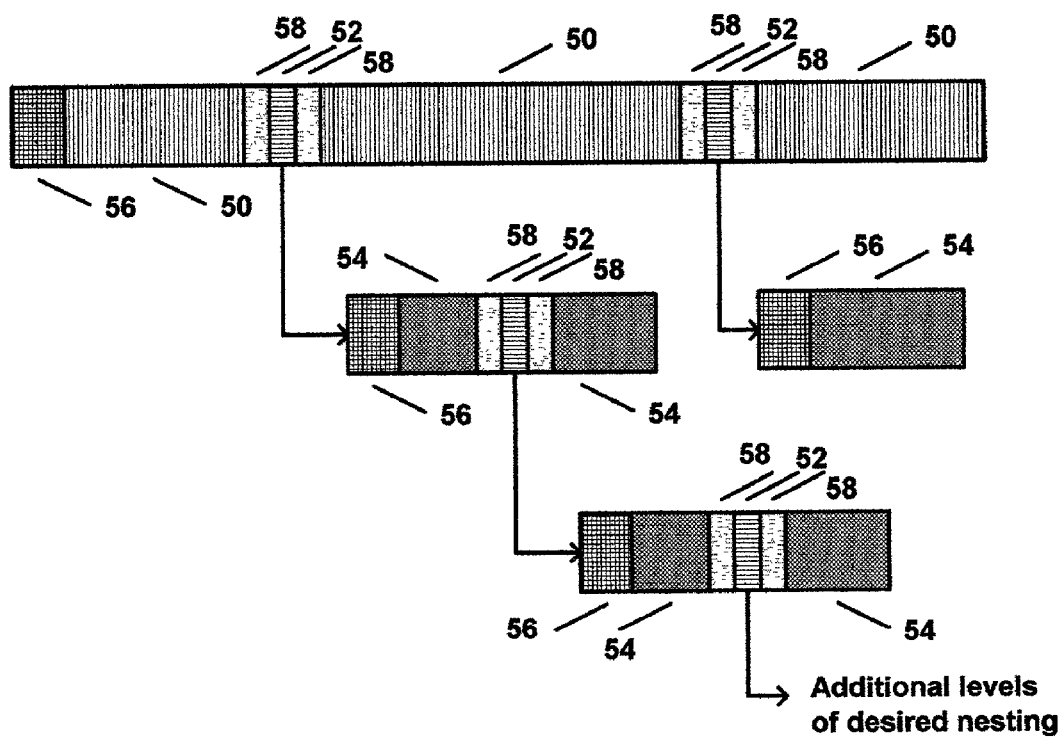
FIG. 5 is a diagram illustrating a summary of the system including streams of sound, markers of sound, and annotation of sound and the other associated capabilities.

Because annotations 54 are also a sound stream 50, any processing that can be accomplished with stream 50 can also be accomplished with annotation 54. For example, a sub-sound annotation 54 (FIG. 2) can be added to a base sound annotation 54. In FIG. 2, as well as in FIG. 5, sound annotations 54 are shown as being linked with sound stream 50 and with other sound annotations 54.

Some examples of sound streams 50 and associated sound glyphs 52 are as follows:

a) A training group in a company can create information concerning a new methodology for handling insurance claims. The information can be included as sound stream 50. Stream 50 can be relatively short and include sound glyphs 52 that point to additional detailed information, covered by sound annotations 54. Employees, reviewing the new claims-handling information, listen to sound stream 50 and at each of sound glyphs 52 can choose to listen to associated sound annotations 54 if the additional information is needed for executing their job function.

A more detailed description of how this is accomplished follows:

The basics of the new methodology for handling insurance claims is a recording of a speech—sound stream 50—in the SOS-A system.

Glyph 52 is inserted at the relevant position in sound stream 50 where further explanation is to be added. For this example, sound glyph 52 is a recording of a piano playing the musical note "middle C" and lasts for 0.5 second.

After sound glyph 52 has been inserted, sound annotation 54 is recorded and linked with appropriate sound glyph 52. After sound glyph 52 has been inserted and sound annotation 54 has been created and linked with sound glyph 52, the result is a speech recording with linked sound annotation 54.

Additional sound glyphs 52 with their associated sound annotations 54 are added to sound stream 50 as needed.

During playback of sound stream 50, when sound glyph 52 ("middle C") is reached, sound stream 50 pauses and the employee is given the option of listening to associated sound annotation 54. If the user chooses not to listen to annotation 54, the user notifies the system and sound stream 50 continues. If the user chooses to listen to sound annotation 54, the user notifies the system causing the playback of annotation 54 to start. When annotation 54 is completed, stream 50 continues until stream 50 is completed or another sound glyph 52 is encountered.

b) A manager creates information regarding a customer situation and desired company response to the customer. This information can be created as sound stream 50 and routed to an employee for action. The employee can review the situation and what is expected of the employee. If the employee has questions for the manager, the employee can create sound glyphs 52 at the points in sound stream 50 where the questions are appropriate. Sound glyph 52 points to associated sound annotation 54, which include the questions or comments the employee has regarding the situation and requested action. The manager can review the employee's questions and/or comments by reviewing sound stream 50. When each sound glyph 52 is reached, the manager may listen to its associated sound annotation 54.

FIG. 2—Sound Annotation Nesting

As seen in FIG. 1, two sound glyphs 52 are inserted in stream 50 and refer to a first level of sound annotations 54. As stated, because sound annotations 54 are themselves sound streams, sound glyphs 52 (FIG. 2) can be added to annotations 54. A second level of sound annotations is also shown in FIG. 2. There are no limits to the number of levels of annotations 54. From a practical point of view, users of the SOS-A system may want to limit the number of nesting levels. Limiting the number of nesting levels is an example of a system-wide attribute which can be stored in the system profile in one or more application profiles 110 (FIG. 7). Some examples of multiple levels of sound annotations are as follows:

a) A group of engineers is creating a design for a wing of a new plane. A telephone meeting is held containing elements of the new design. This telephone conversation is captured as sound stream 50 and is distributed to engineers who attended and didn't attend the telephone conversation. The engineers are asked for their comments to the design direction and specifics. The engineers can create sound glyphs 52 at the appropriate places in sound stream 50. Sound glyphs 52 identify who is responding and point to associated sound annotations 54. Sound annotations contain comments, amplifying information, agreement, disagreement, etc. By selecting annotations 54 after they are created and distributed, the engineers can review annotations 54. Of course the engineers can also create sound annotations for previously created annotations 54 as well as to original sound stream 50.

b) A headquarters group is considering changes to the company's medical insurance and they desire comments and suggestions from employees. The headquarters group can create sound stream 50 and distribute it to the employees from whom they want the feedback. The employees can create sound glyphs 52 at the appropriate places in sound stream 50 and associated sound annotations 54. Sound glyphs identify who is responding and point to associated sound annotations 54. Anyone can review the various sound annotations. If someone wants to make comments to annotations 54, they can create sound annotations that are associated with previous annotations 54.

Figure 3:
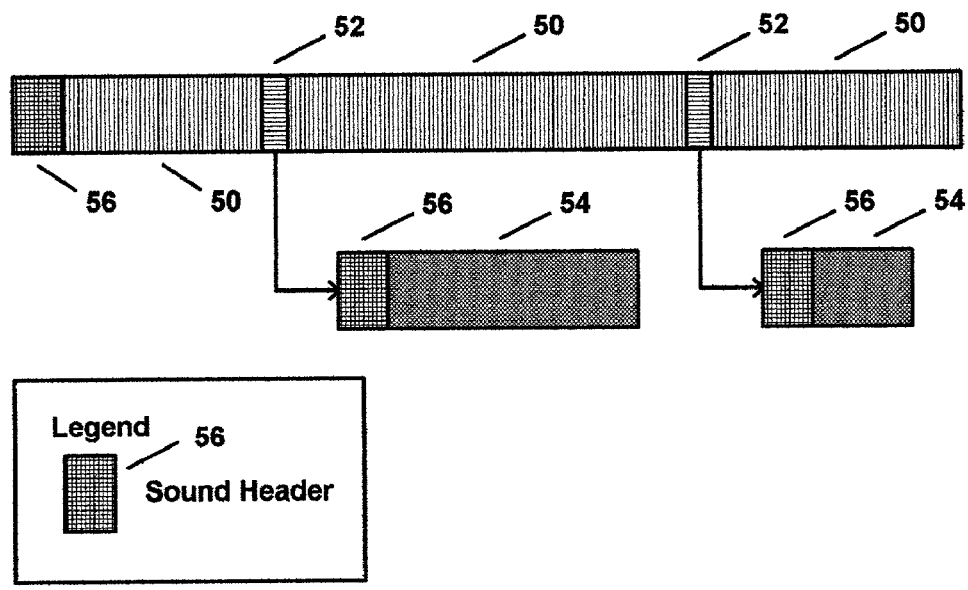
FIG. 3 is a diagram illustrating the system's capability to identify streams of sound and annotations of sound.

FIG. 3—Sound Header

As shown in FIG. 3, a sound header 56 identifies sound stream 50 and is located at the beginning of stream 50 and annotation 54. It is the basis for relevant information about stream 50 or annotation 54, and forms a database key for cataloging, storing, and retrieving sound streams 50 into and/or from application database 108 (FIG. 7). Streams 50 and annotations 54 must be uniquely stored in application database 108. Sound headers 56 are used by application program 106 to facilitate storing and retrieving sound streams 50 and/or sound annotations 54 in application database 108. An example of sound header 56 is the time and date of the creation of sound stream 50 or sound annotation 54. When sound stream 50 or sound annotation 54 is played back, users might hear computer-generated speech saying the time and the date.

The content of sound headers 56 is identified by the users of the SOS-A system. Some examples of the information which can be included in sound header 56 are the name, the date, the time, the project, the topic, etc. The criteria for headers 56 are another example of information that is stored in application profile 110.

FIG. 3 shows stream 50 with two glyphs 52 and two associated annotations 54. Stream 50 and annotations 54 include headers 56.

Figure 4:
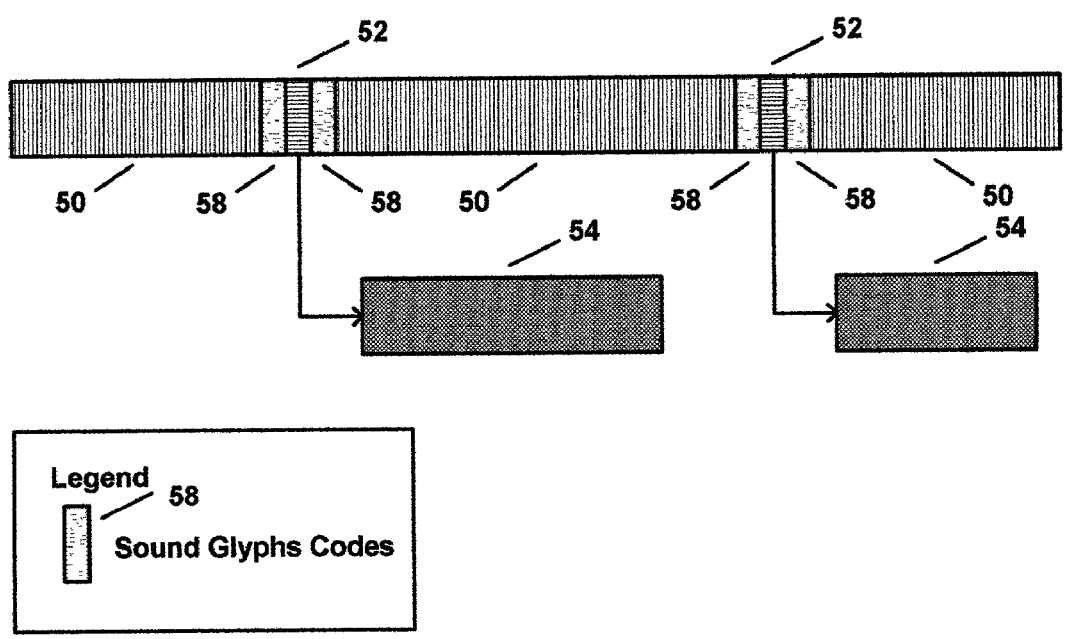
FIG. 4 is a diagram illustrating the system's capability for identifying the beginning and ending of markers of sound.

FIG. 4—Sound Glyph Codes

Because sound glyphs 52 can be positioned anywhere in sound stream 50 or sound annotation 54, an application program 106 (FIG. 7) is provided so that a user or the SOS-A system can locate glyphs 52. One way to locate glyphs 52 is through the use of a sound glyph code 58 (FIG. 4), which is a special sound that identifies the start and end of each glyph 52 and enables the SOS-A system to identify the start and end of glyph 52. Sound glyph code 58 can be any predetermined sound frequency of any duration and is defined within the SOS-A system; however, it is typically an inaudible sound of short duration, for example a 0.5 second tone which is a sound frequency above human hearing. Glyph codes 58 can be used, for example, to find the start of each glyph 52 when the user has identified that they want to skip forward in stream 50 to next glyph 52.

Glyph codes 58 are added to the beginning and end of each glyph 52 to identify the start and completion of each glyph 52. FIG. 4 shows sound glyph codes 58 added to two glyphs 52.

FIG. 6—Environment

Figure 6:
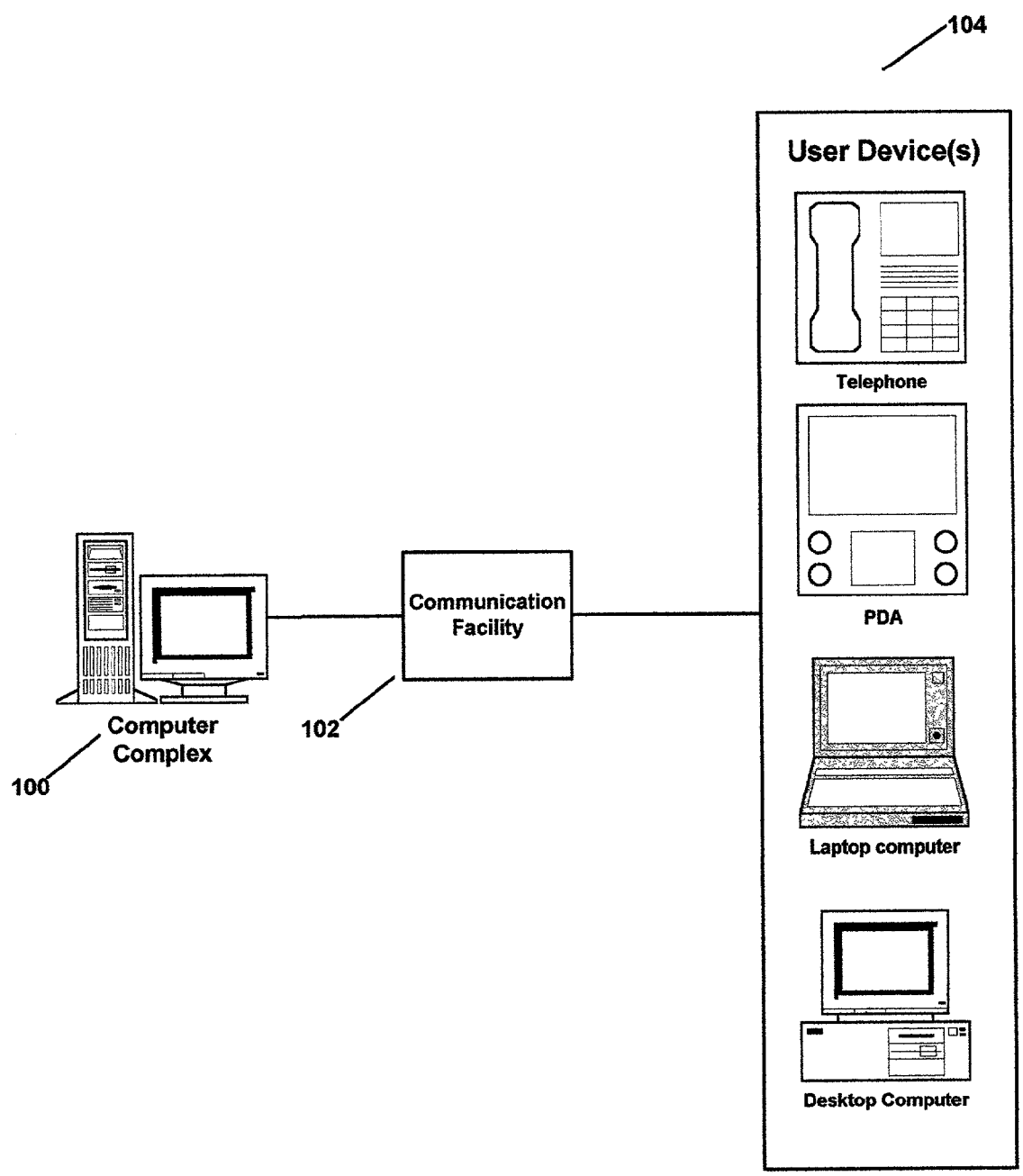
FIG. 6 shows an overall diagram of the system.

FIG. 6 shows a typical overall SOS-A environment. An SOS-A environment consists of one or more computers in a computer complex 100, communication facility 102, and one or more user devices 104. Computer complex 100 provides one or more application programs 106 (FIG. 7) for operating and administering the SOS-A system. Communication facility 102 provides communication between computer complex 100 and user devices 104. User devices 104 provide capability for a user to interact with the system through a user interface 116 (FIG. 7), for example through text entry, clicking on options with a mouse, verbal commands, etc. User devices 104 are telephones, PDAs, laptop computers, desktop computers, or any other device meeting the required functionality for user device 104, as identified in the next section.

FIG. 7—System Environment

FIG. 7 shows specifics of the overall environment or a system environment. Computer programs or application program(s) 106 operate and administer the SOS-A system. Application program 106 preferably consists of a computer program but can be several programs. Some examples of functionality provided by application program 106 are identified below. Details of these capabilities are described in the section titled "System Execution."

a) signing-on to or signing-off from the SOS-A system;
b) cataloging recorded sound into the SOS-A system;
c) creating, cataloging, storing, retrieving, and management and control of sound streams 50, sound glyphs 52, and sound annotations 54;
d) locating sound streams 50 that have been previously cataloged in the SOS-A system;
e) playing back of sound streams 50 and sound glyphs 52 with the associated sound annotations 54;
f) creating, sending, and/or displaying one or more map graphics 112;
g) distribution of sound streams 50 and sound glyphs 52 with associated sound annotations 54;
h) updating application profile 110;
i) producing application reports 114;
j) controlling sessions with users; and
k) providing user interface 116.

Application program 106 resides in computer complex 100; however if any user device 104 includes stored program and computing capabilities, parts of the application program 106—for example support for user interface 116—can reside in user device 104. Application program 106 typically operate in any commercially available operating environment. Some examples of commercially available operating environments are UNIX, LINUX, Windows, and MVS, which are commercial operating systems by various companies. Computer complex 100 provides the operating environment for application program 106. Computer complex 100 consists of systems software and one or more computers and/or processing units; some examples are mainframe computers, mid-range computers, and servers. The computers and/or processors can be linked either locally or remotely.

Sound streams 50, sound glyphs 52, and sound annotations 54 are stored in one or more application databases 108. The database capability is typically provided by database products and/or file systems that are commercially available.

This capability includes usage of replicated and distributed databases. Commercially available database products are available from Oracle Corporation; International Business Machines Corporation; Sybase, Inc.; Microsoft Corporation, etc.

Tailoring of the SOS-A system is facilitated by one or more application profiles 110. Application profile(s) 110 are one or more databases where user parameters or options are stored that affect execution of the SOS-A system to meet specific customer operational requirements. There are multiple levels of application profiles 110 such as: a) a system profile, b) a project/department profile, and c) a user profile. The multiple levels of application profiles 110 facilitate various levels of actions and/or procedures according to desired results. Also, there can be multiple levels of the project/department profile to enhance local tailoring. Application profiles 110 are used for both on-line and off-line processing. For example, on-line usage includes checking for security authorization. An example, of off-line usage is reporting on the contents of application profile 110. Some examples of the content of application profile 110 are as follows:

- a) system profile: system-wide attributes (for example, the number of nesting levels of annotation 54 that are allowed, the information that is included in the cataloging of streams 50, annotations 54, etc.);
- b) project/department profile: grouping (project, department, etc.), distribution lists, personnel assigned, override of a system-wide attribute, etc.;
- c) user profile: information concerning a person; for example, name, position, address, password, personal sound glyph 52, voice print, etc.

A map graphic 112 is a graphical representation of streams 50 and glyph 52 with associated annotation 54. Map graphic 112 provides visual representation of the structure of sound streams 50 and sound annotations 54 for better understanding of more complex SOS-A sound structures.

Map graphic 112 may, for example, show the relationship of sound stream 50 and associated sound annotations 54 in a hierarchical structure, similar to FIG. 1 or 2. Sound stream 50 preferably is at the top of the hierarchy with sound annotations 54 shown at the second level. If there is a second level of sound annotations 54, they would be shown as the third level in the hierarchy. Information contained in sound glyphs 52, e.g., name and date, can also be added to the graphical representation.

Map graphic 112 can be used as follows: If user device 104 includes display capability, associated map graphic 112 can be displayed and sound stream 50 or sound annotation 54, which is currently being played back, can be highlighted and/or flashing.

Application reports 114 provide capability for producing reports; some examples are system and application usage, status, etc.

Communication and interconnection between application program 106 and user devices 104 are provided by communication facility 102. Communication facility 102 is typically provided by commercially available communication hardware and software products. Application program 106 is independent of communication facility 102. Communication facility 102 supports both wired and wireless operations. The required capabilities for user devices 104 are: 1) playback or listening capability, 2) recording capability, for example a microphone, and 3) interface to the communication facility 102. Some examples of optional capabilities are:

- a) display capability (such as a display screen panel) of any size, color or black/white with or without touch screen capability;
- b) text entry capability (such as a keypad or keyboard);
- c) stored program and compute capability; and/or
- d) local data storage.

Figure 8:
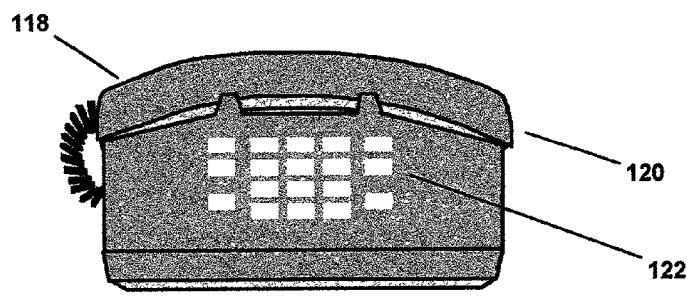
FIG. 8 shows a device which is used by a user of the system.

One example of user device 104 is a telephone as shown in FIG. 8. This telephone includes the two required capabilities of user device 104, namely: 1) a listening capability, a telephone speaker 120, and 2) a recording capability, a telephone microphone 118, and one optional capability, a telephone keypad 122. Telephone speaker 120, telephone microphone 118, and telephone keypad 122 are standard capabilities currently offered on telephones.

User devices 104 provide an application interface, or user interface 116, for the user to communicate with the SOS-A system, for example through text entry, clicking on options with a mouse, verbal commands, etc.

The telephone of FIG. 8, as an example of user device 104, includes capabilities to provide functionality for user interface 116. This functionality is telephone speaker 120 and telephone keypad 122. With telephone speaker 120 the user listens to sound streams 50, sound glyphs 52, and sound annotations 54. With telephone keypad 122, the user notifies the system of what the user wants to accomplish. An example of telephone keypad usage for playback could be using the keys on telephone keypad 122 as follows:

- a) Key 1—skip backward 3 seconds.
- b) Key 2—start or resume listening to the sound recording.
- c) Key 3—skip forward 3 seconds.
- d) Key 4—skip to next sound glyph 52.
- e) Key 5—stop or pause listening to the sound recording.
- f) Key *—help.
- g) Key 0—end.

Some examples of system functionality that are identified by the user through user interface 116 are as follows:

- a) log-on to, including password or other security controlled entry, and log-off from the SOS-A system;
- b) catalog and store a previously recorded sound stream 50 into the SOS-A system;
- c) locate previously cataloged and stored sound streams 50, sound glyphs 52, and sound annotations 54; (Some examples of locate capabilities are: obtaining the cataloged criteria, retrieving, selecting if there are multiple answers for the search criteria, and handling error conditions.)
- d) playback sound streams 50 with any associated glyphs 52, and any associated annotations 54; (Some examples of playback capabilities are: start play, stop play (pause), skip backward "n" seconds, skip forward "n" seconds, skip to the next sound glyph 52, and select to playback the sound annotation 54.)
- e) create streams 50, glyphs 52, and annotations 54; (Some examples of create capabilities are: 1) cataloging (retrieve the catalog criteria verify that the catalog criteria are unique, and execute the cataloging), 2) creating (record or create streams 50, glyphs 52, and annotations 54, and 3) reviewing (accept or re-create streams 50, glyphs 52, and annotations 54 that have been previously created.)
- f) map stream 50 with glyphs 52 and associated annotations 54; (Map graphic 112 is a graphical representation of stream 50 with glyphs 52 and associated annotations 54. Graphic 112 helps to understand the recorded structure in complex situations.)

g) create reports. (Produce system and application reports 114.)

System Execution

Figure 9:
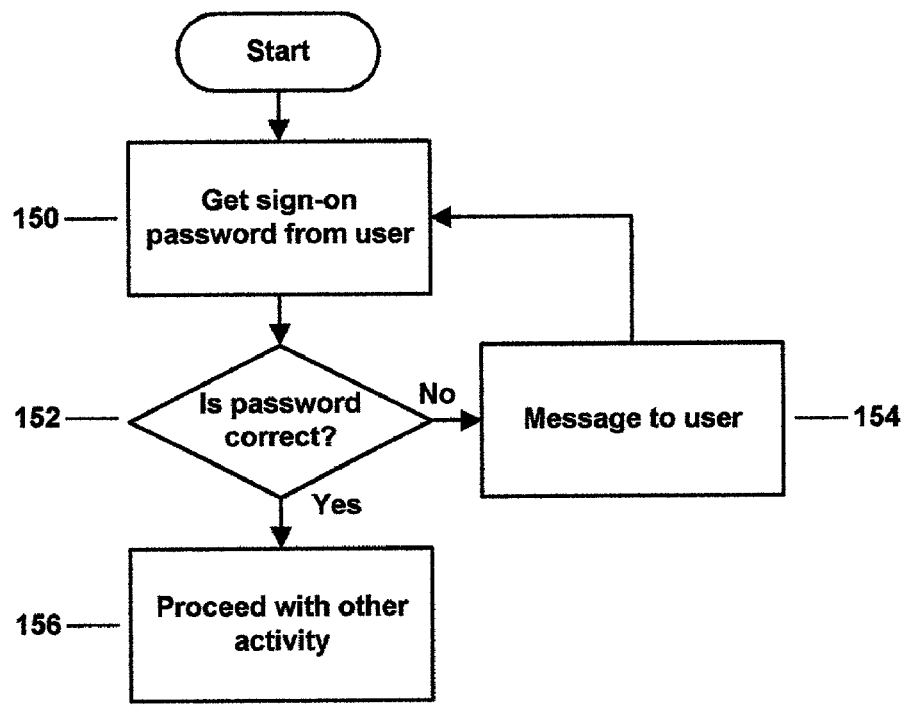
FIG. 9 is a flowchart illustrating how signing-on to the system is accomplished.
Figure 10:
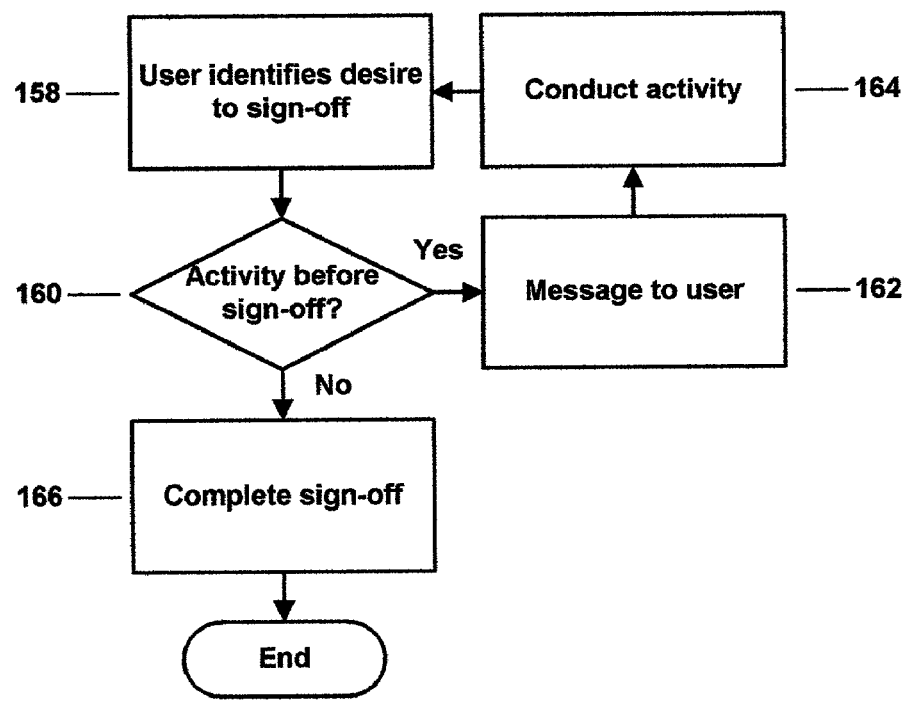
FIG. 10 is a flowchart illustrating how signing-off from system is accomplished
Figure 11:
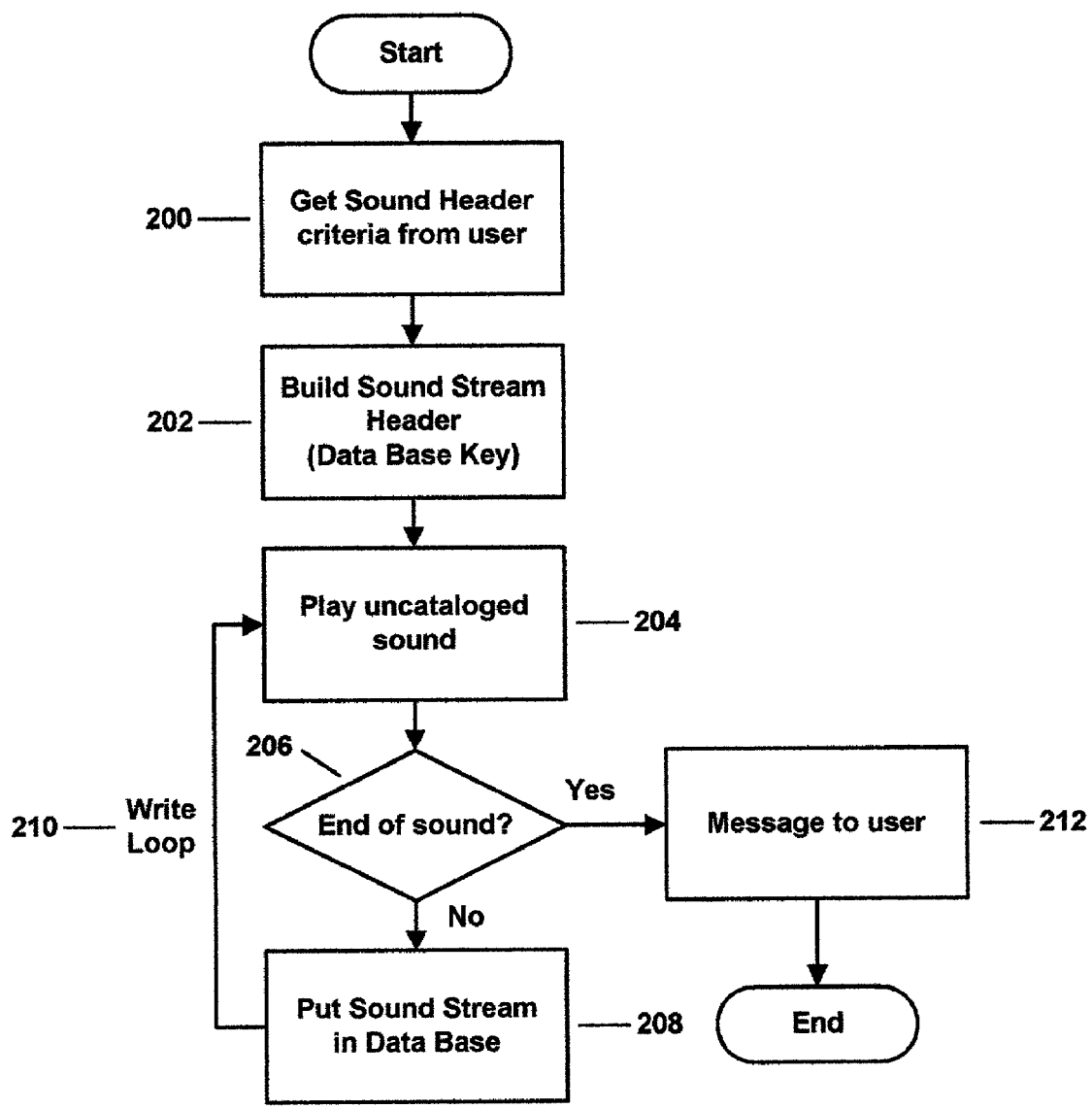
FIG. 11 is a flowchart illustrating how a previous recorded stream of sound is cataloged into the system.
Figure 12:
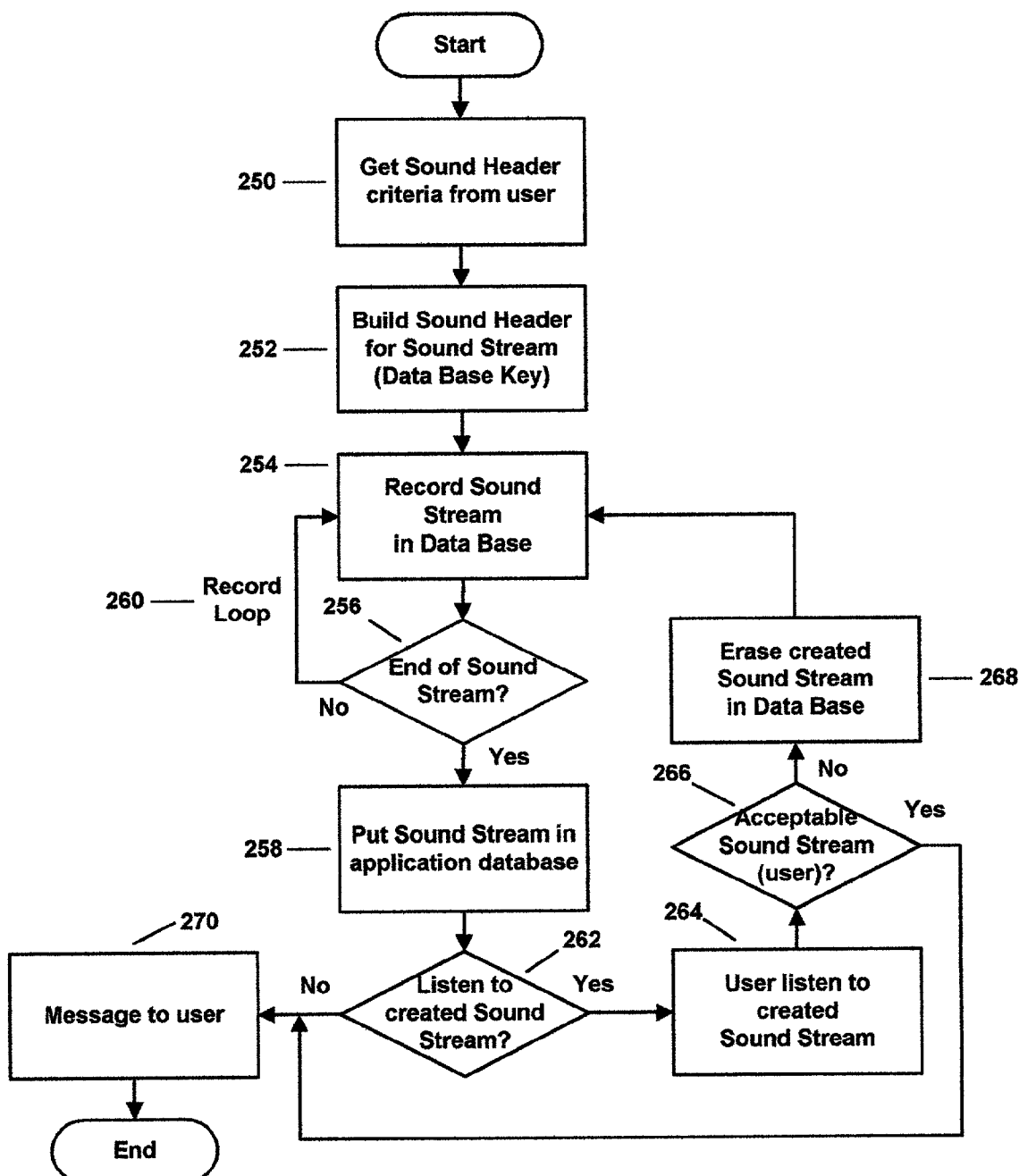
FIG. 12 is a flowchart illustrating how creating a stream of sound in the system is accomplished.
Figure 13:
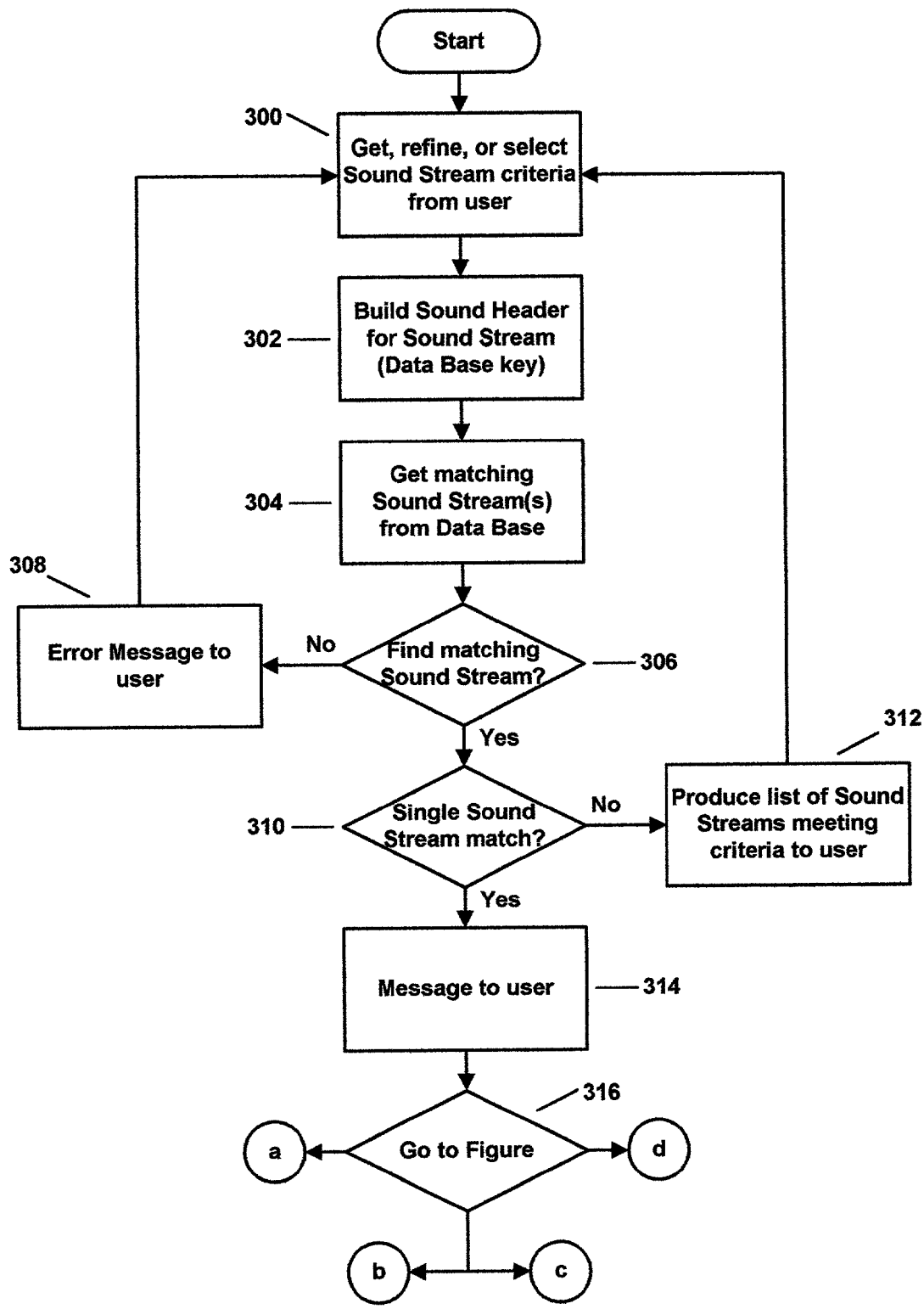
FIG. 13 is a flowchart illustrating how locating a stream of sound that has been previously recorded and cataloged in the system is accomplished.
Figure 14:
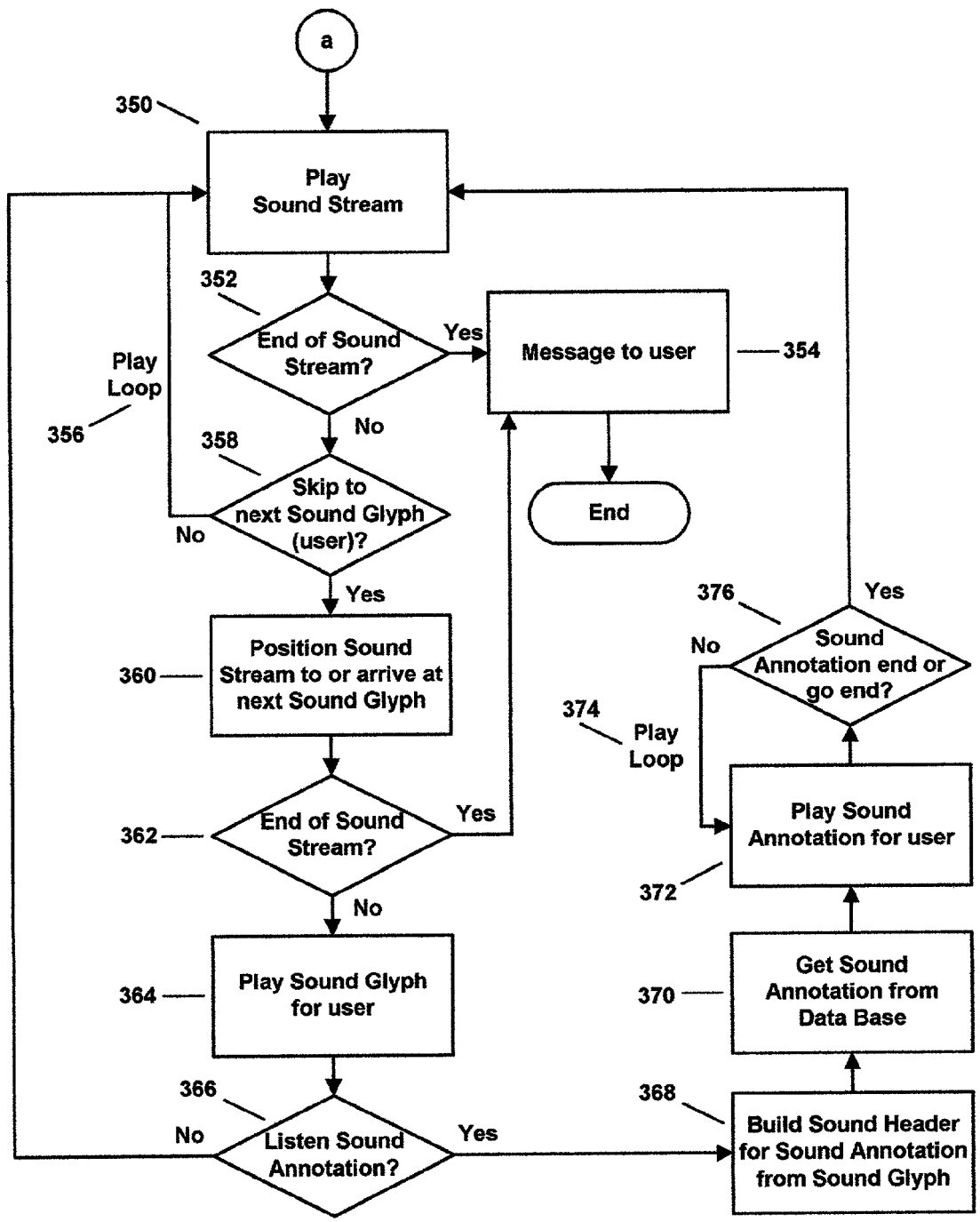
FIG. 14 is a flowchart illustrating how playing back a previously recorded and cataloged stream of sound with the associated annotations of sound is accomplished in the system.
Figure 15:
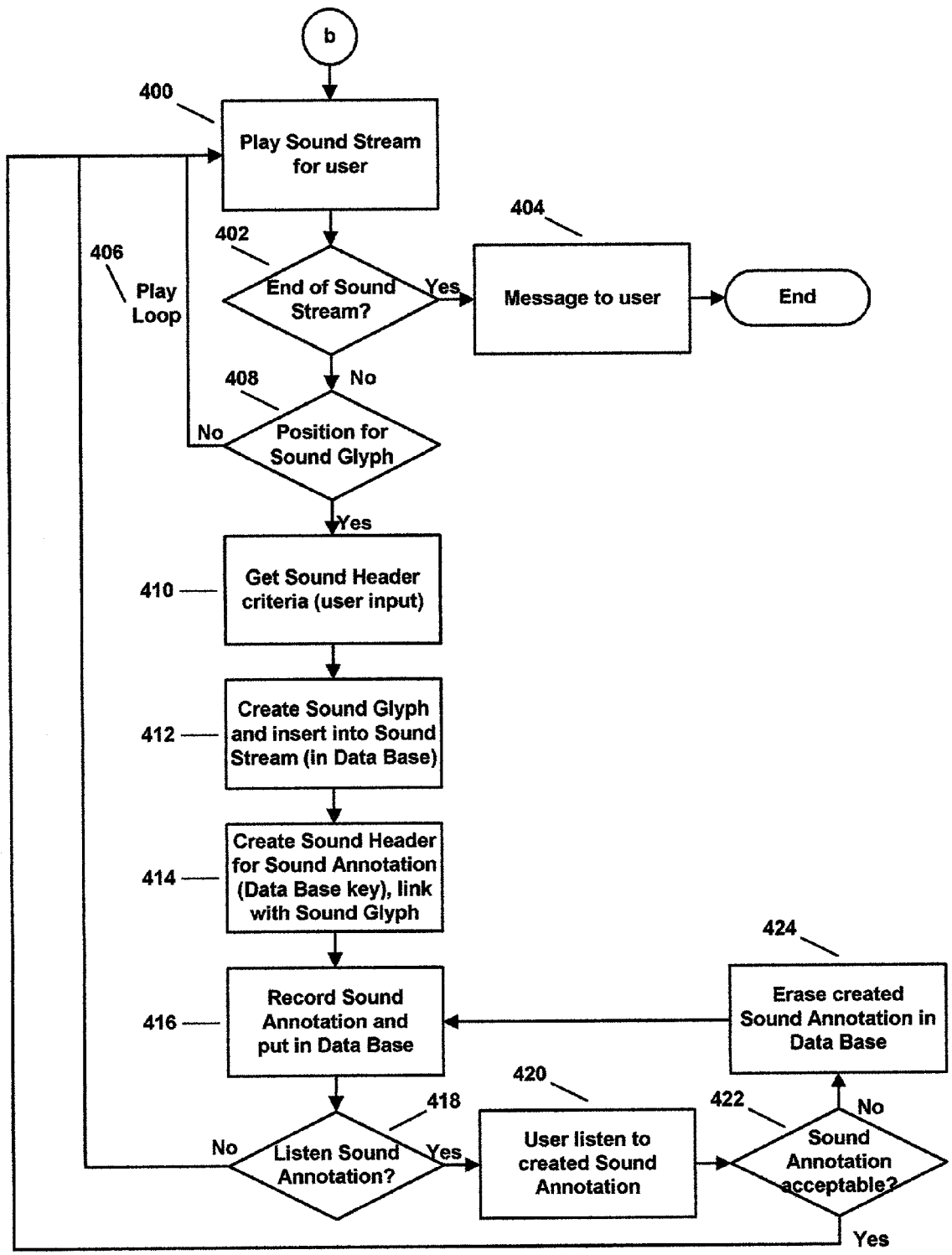
FIG. 15 is a flowchart illustrating how creating markers of sound and the associated annotations of sound in a previously recorded and cataloged stream of sound is accomplished.
Figure 16:
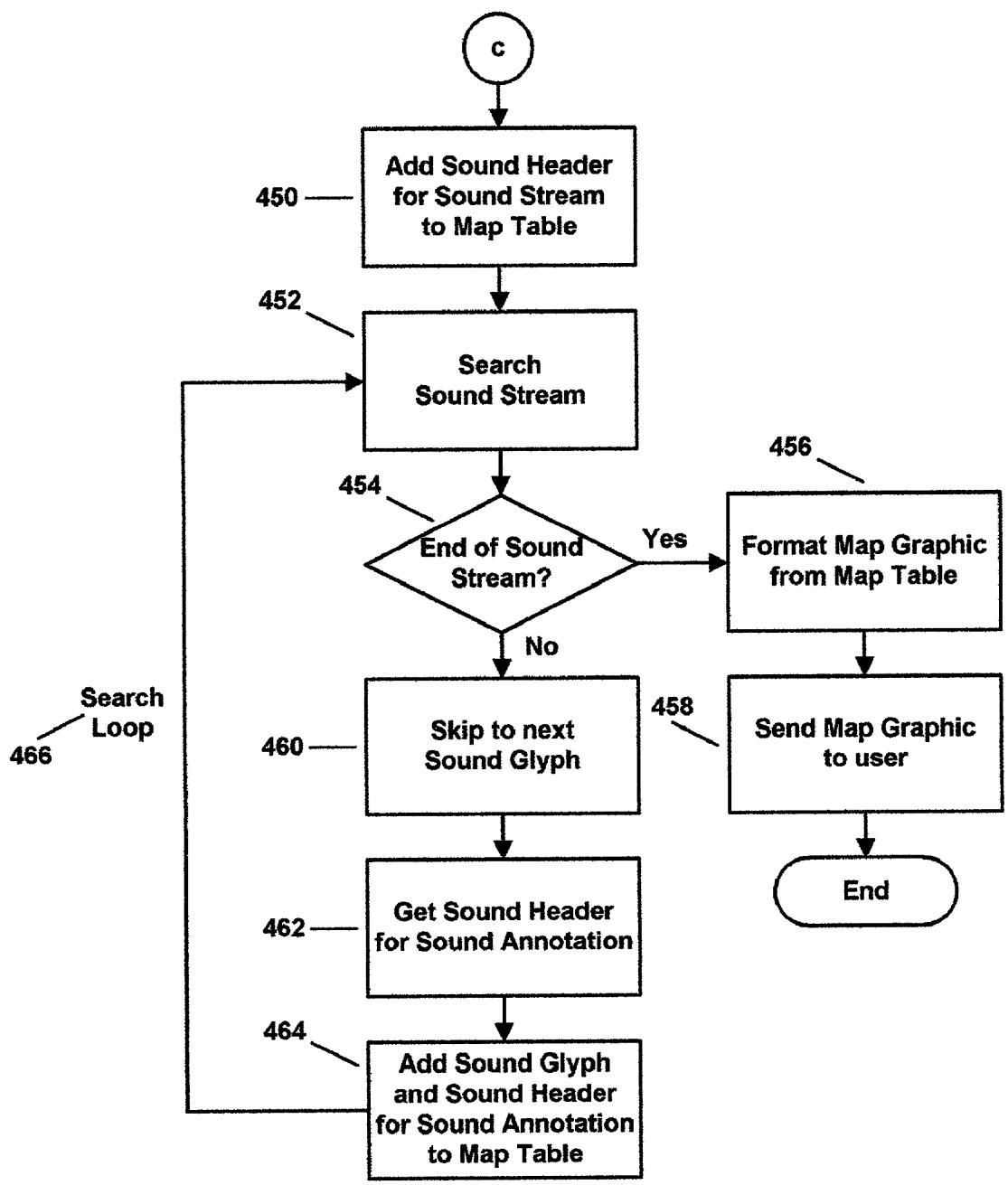
FIG. 16 is a flowchart illustrating how creating a map for previously recorded and cataloged streams of sound and their markers of sound with the associated annotations of sound is accomplished.
Figure 17:
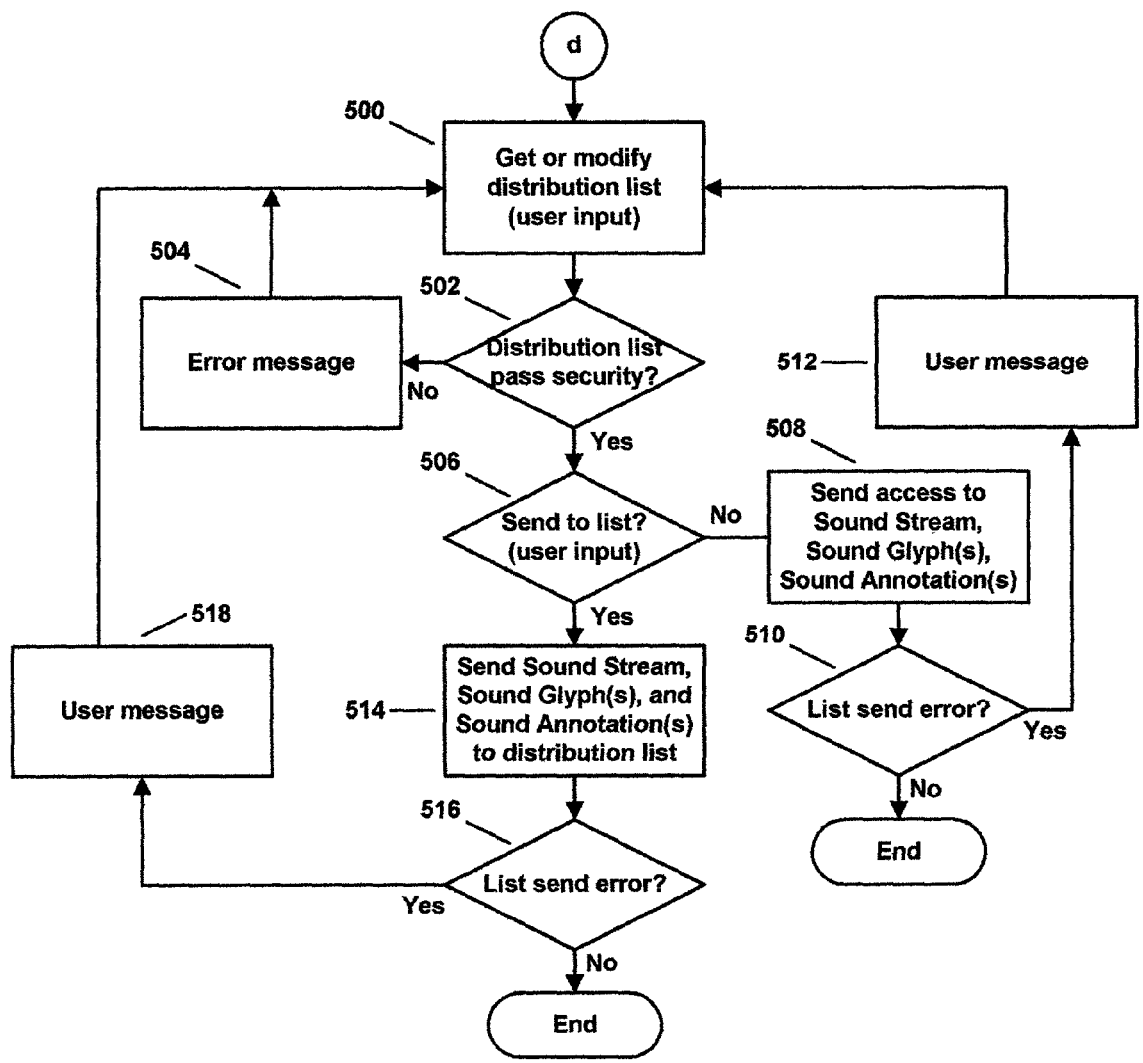
FIG. 17 is a flowchart illustrating how distributing or making available streams of sound and markers of sound with their associated annotations of sound is accomplished.
Figure 18:
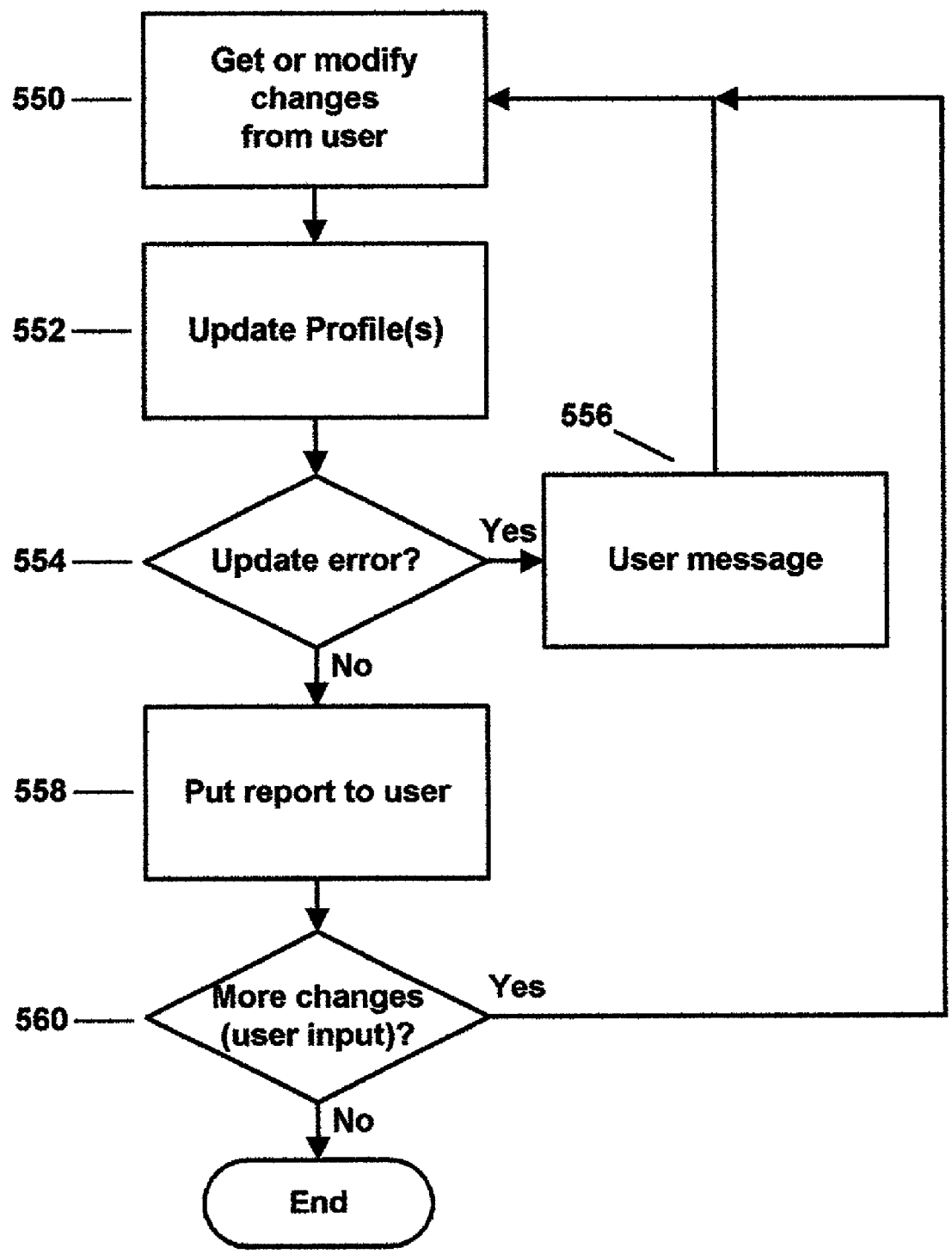
FIG. 18 is a flowchart illustrating how system administration, updating one or more application profiles of the system, is accomplished.
Figure 19:
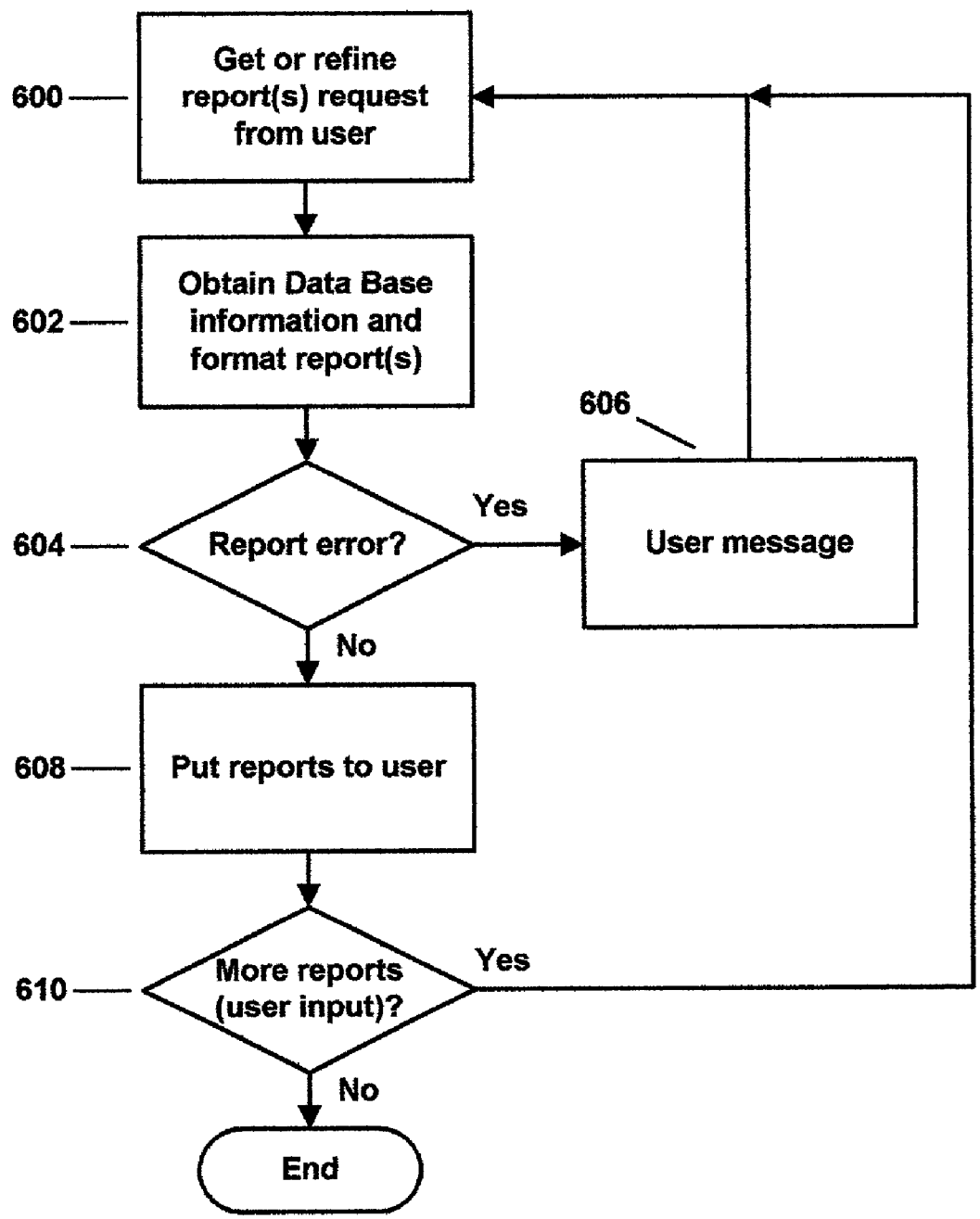
FIG. 19 is a flowchart illustrating how system administration, to create reports for the application, is accomplished.

Execution or operation of a preferred embodiment of the SOS-A system is illustrated in the flowcharts of FIGS. 9 to 19. These flowcharts show execution activities that are implemented by one or more application programs 106 which are stored in computer complex 100. These figures illustrate the execution activities for the following system operations:

FIG. 9 (Signing-on to the SOS-A System),

FIG. 10 (Signing-off from the SOS-A System),

FIG. 11 (Cataloging and Storing Existing Sound in the SOS-A System),

FIG. 12 (Directly Creating a Sound Stream in the SOS-A System),

FIG. 13 (Locating a Sound Stream),

FIG. 14 (Playback of a Sound Stream and Sound Glyphs with the Associated Sound Annotations), FIG. 15 (Creating Sound Glyphs and the Associated Sound Annotations), FIG. 16 (Create Map Graphic), FIG. 17 (Distribution), FIG. 18 (Update of the Application Profile), and FIG. 19 (Create Application Reports).

FIG. 9—Signing-on to the SOS-A System

User sign-on security is provided by the SOS-A system; however, this is not a mandatory capability. Users of the SOS-A system can choose to use this capability or not. Whether sign-on security is utilized or not, it is an attribute that is stored in application profile 110 (FIG. 7). The user notifies the SOS-A system, through user interface 116, of the user's desire to sign-on to the SOS-A system, and the user enters a password, or other means of identification (block 150). Application program 106 verifies that the password is correct (block 152). If the password is not correct, application program 106 sends a message to the user (block 154). The user is able to re-enter a correct password (block 150). When the password is correct, the user is signed-on to the SOS-A system and can utilize any of the authorized SOS-A system activities (block 156).

FIG. 10—Signing-off from the SOS-A System

User sign-off is provided by the SOS-A system; however, as with sign-on, this is not a mandatory capability. The users of the SOS-A system can choose to use this capability or not. Whether the sign-off security is utilized or not, it is an attribute that is stored in application profile 110. The user notifies the SOS-A system, through user interface 116, that the user wants to sign-off from the SOS-A system (block 158). The SOS-A system determines whether there are any activities that should be completed before the user signs-off (block 160). If there are activities needing to be completed, application program 106 sends a message to the user (block 162). The user is encouraged to complete the activity before signing off from the system (block 164). An example of an activity that should be completed is the situation where sound glyph 52 has been created for sound stream 50, but associated sound annotation 54 has not been created. The SOS-A system reminds the user that they may do so before signing-off. If there are no activities needing to be completed, user sign-off is completed (block 166). The user can bypass completing the activities and force the sign-off.

FIG. 11—Cataloging and Storing Existing Sound in the SOS-A System

FIG. 11 deals with sound that has been recorded but is not known to the SOS-A system. An example of this is a sound recording of a presentation that was given by the president of a company. E.g., a competitor recorded a speech (observing any legal requirements) and wants to deliver it to the competitor's vice-presidents of sales, marketing, and development, asking them for comments. The SOS-A system can be used to do this, but the recorded speech must first be cataloged and stored within the SOS-A system.

The sound header information is obtained (block 200) from two sources: 1) from the user, through user interface 116, and 2) from system generation. An example of system generated sound header information is today's date and time.

Once the sound header information has been received, application program 106 creates sound header 56 for sound stream 50 that is being cataloged and stored in application database 108 (block 202).

Application program 106 forms the database key (block 202) from sound header 56.

The uncataloged sound plays (block 204).

As the uncataloged sound plays, application program 106 catalogs and stores it (block 208) in application database 108. This write loop (block 210) continues until the complete sound stream 50 is stored (block 208) in application database 108.

Once the end of the sound has been reached (block 206), application program 106 sends a message to the user (block 212) and the activity is completed.

FIG. 12—Directly Creating a Sound Stream in the SOS-A System

FIG. 12 deals with directly creating, (cataloging, recording, and storing) sound stream 50 into the SOS-A system.

The sound header information is obtained (block 250) from two sources: 1) from the user, through user interface 116 and 2) from system generation. Application program 106 builds sound header 56 and the database key (block 252) from the sound header information.

Application program 106 stores the recording (block 254) of sound stream 50 (block 258) in application database 108.

This record loop (block 260) continues until the recording is completed (block 256). Once the recording has been completed (block 256), the user is given the choice to review the newly cataloged and stored sound stream 50 or not (block 262).

If the user selects not to review sound stream 50, application program 106 sends a message to the user (block 270), and the activity is completed.

If the user selects to review (block 262) the newly recorded sound stream 50, the user listens to it (block 264). The user is given the choice if sound stream 50 is acceptable or not (block 266). If it is acceptable, application program 106 sends a message to the user (block 270), and the activity is completed. If sound stream 50 is not acceptable to the user (block 266), application program 106 erases sound stream 50 (block 268) from application database 108, and the user can record sound stream 50 again (block 254).

FIG. 13—Locating a Sound Stream

FIG. 13 deals with locating sound stream 50 that has already been created in the SOS-A system. The sound stream being located can be sound streams 50 or sound annotations 54 because sound annotations 54 are also sound streams 50.

The information that was used to create sound header 56 in sound stream 50 is obtained (block 300) from the user.

Application program 106 builds sound header 56 and the database key (block 302) from the information about sound header 56.

Application program 106 retrieves sound streams 50 that match the database key (block 304). If there are no matching (block 306) sound streams 50, application program 106 sends a message to the user (block 308) and the user refines (block 300) the sound header information. If there are multiple matches (block 310), application program 106 sends a list of the multiple sound streams 50 to the user (block 312). The user can select (block 300) desired sound stream 50. An example of multiple matches is the situation where the user provides sound header name and date information. Multiple sound streams 50 were created by the named person on that date. Application program 106 creates the list of sound streams (block 312) along with creation times so that the user can select a desired sound stream 50.

Once there is a single match (block 310), application program 106 sends a message to the user (block 314). The user can then conduct other SOS-A system activities (block 316) as described in the following sections: a) "FIG. 14—Playback of a Sound Stream and Sound Glyphs with the Associated Sound Annotations", b) "FIG. 15—Creating Sound Glyphs and the Associated Sound Annotations", c) "FIG. 16—Create Map Graphic", and d) "FIG. 17—Distribution".

With the location of sound stream 50, sound glyphs 52 and the associated sound annotations 54 are also available.

FIG. 14—Playback of Sound Stream and Sound Glyphs with the Associated Sound Annotations FIG. 14 illustrates playback, assuming that sound stream 50 has been located. The locating of sound stream 50 is described in the section associated with FIG. 13.

Playback of sound stream 50 starts (block 350). If the end of sound stream 50 is reached (block 352), application program 106 sends a message to the user (block 354) and the playback is completed.

The user listens to sound stream 50 via the play loop (block 356). At any time the user can request skipping (block 358) to the next sound glyph 52. Sound stream 50 is positioned at next sound glyph 52, either because the user requested the positioning (block 360) or because the user listened to sound stream 50 and arrived (block 360) at sound glyph 52.

If the end of sound stream 50 is reached (block 362), application program 106 sends a message to the user (block 354) and the playback is ended. If the end of sound stream 50 has not been reached, sound glyph 52 plays (block 364). The user has the option of listening (block 366) to associated sound annotation 54.

If the user chooses not to listen (block 366) to sound annotation 54, playback (block 350) of sound stream 50 continues.

If the user selects to listen (block 366) to sound annotation 54, application program 106 builds sound header 56 and the application database key (block 368) from sound glyph 52.

Application program 106 retrieves sound annotation 54 (block 370) from application database 108 and playback (block 372) of sound annotation 54 starts. The playback, via play loop (block 374), continues until either the end (block 376) of sound annotation 54 is reached or the user requests to go to the end (block 376) of sound annotation 54.

Once the end (block 376) of sound annotation 54 has been reached, the user again listens to playback (block 350) of sound stream 50.

FIG. 14 depicts playback for sound stream 50 with only a single level of sound annotations 54. If sound stream 50 has multiple levels of sound annotations 54, the playback flow is extended in a similar manner to the flow that is described in this section.

FIG. 15—Creating Sound Glyphs and the Associated Sound Annotations

FIG. 15 illustrates playback, assuming that sound stream 50 has been located. The locating of sound stream 50 is described in the section associated with FIG. 13.

Playback of sound stream 50 starts (block 400). If the end of sound stream 50 is reached (block 402), application program 106 sends a message to the user (block 404) and the activity is completed.

The playback of sound stream 50 continues via play loop (block 406) until the user identifies his or her desire to create (block 408) sound annotation 54 at that position in sound stream 50. The user can position sound stream 50 by moving backward or forward to identify the exact location for the sound annotation 54 to be placed (block 408).

Once sound stream 50 has been positioned (block 408), the sound header information for sound annotation 54 is received from the user (block 410). Application program 106 creates and inserts sound glyph 52 (block 412) into sound stream 50, stores this update (block 412) in application database 108, and creates sound header 56 for sound annotation 54 (block 414).

Once sound header 56 is created (block 414), application program 106 records and stores sound annotation 54 (block 416) in application database 108. The user has the choice of listening (block 418) or not to sound annotation 54 that has just been created (block 416). If the user selects not to listen (block 418) to annotation 54, playback of sound stream 50 continues (block 400).

If the user selects to listen (block 418) to sound annotation 54, application program 106 plays newly created sound annotation 54 (block 420). The user can choose whether sound annotation 54 is acceptable or not (block 422). If sound annotation 54 is acceptable (block 422), playback of sound stream 50 continues (block 400). If sound annotation 54 is not acceptable (block 422), application program 106 erases sound annotation 54 (block 424) from application database 108, and new sound annotation 54 is again recorded and stored (block 416) in application database 108.

FIG. 15 depicts the creation of sound glyphs 52 and associated sound annotations 54 for only a single level of sound annotations 54. If there are multiple levels of sound annotations 54, the creation flow is extended in a similar manner to the flow that is described in this section.

FIG. 16—Create Map Graphic

FIG. 16 illustrates creating map graphic 112, assuming that sound stream 50 has been located. The locating of sound stream 50 is described in the section associated with FIG. 13.

Application program 106 adds sound header 56 from sound stream 50 (block 450) to a table, i.e., a map table for storing and associating information from sound headers 56, that is created in application program 106. Application program 106 searches (block 452) sound stream 50 to look for next sound glyph 52.

If the end of sound stream 50 is reached (block 454), application program 106 formats map graphic 112 (block 456) from the sound header information that has been added to the map table. Application program 106 sends resulting map graphic 112 to the user (block 458) and the activity is completed. Map graphic 112 provides the user with a graphical structure of sound streams 50 and sound glyphs 52 with associated sound annotations 54. Map graphic 112 is useful for improved understanding of more complex sound structures.

If the end of sound stream 50 has not been reached (block 454), application program 106 searches sound stream 50 for next sound glyph 52. When sound stream 50 has been positioned (block 460) at next sound glyph 52, application program 106 retrieves the sound header information for sound glyph 52 and associated sound annotation 54 (block 462) and this information is added to the map table (block 464). The search of sound stream 50 continues, via search loop (block 466).

FIG. 16 depicts the creation of map graphic 112 for only a single level of sound annotations 54. If there are multiple levels of sound annotations 54, map graphic 112 flow is extended in a similar manner to the flow that is described in this section.

FIG. 17—Distribution

FIG. 17 illustrates distribution, assuming that sound stream 50 has been located. The locating of sound stream 50 is described in the section associated with FIG. 13. Application program 106 creates the distribution list for disseminating sound stream 50 and sound glyphs 52 with associated sound annotations 54. The distribution list is created (block 500) from two sources: 1) from user input, and 2) from information stored in application profile 110. Application program 106 analyzes the distribution list for security purposes (block 502). If there are one or more security problems with the distribution list, application program 106 sends an error message to the user (block 504) for modification of the distribution list (block 500).

If the distribution list passes the security check (block 502), a decision (block 506) is made whether to send sound stream 50 to the distribution list or to simply notify the distribution list that sound stream 50 is available for reviewing. Input for this decision (block 506) can come from two sources: 1) from the user, or 2) from information stored in application profile 110.

If the decision (block 506) is made to only notify of the availability of sound stream 50, application program 106 sends a notification of sound stream 50 and sound glyphs 52 with associated sound annotations 54 and any instruction for how to retrieve them (block 508) to the distribution list. If there are one or more errors sending (block 510) to the distribution list, application program 106 sends an error message (block 512) to the user and the user can modify (block 500) the distribution list as needed. If there are no errors sending (block 510) to the distribution list, the activity is completed.

If the decision (block 506) is made to send sound stream 50 to the distribution list, application program 106 sends sound stream 50 and sound glyphs 52 with associated sound annotations 54 (block 514) to the distribution list. If there are one or more errors sending (block 516) to the distribution list, application program 106 sends an error message (block 518) to the user and the user can modify (block 500) the distribution list as needed. If there are no errors sending (block 516) to the distribution, the activity is completed.

FIG. 18—Update of the Application Profile

Changes to one or more application profiles 110 are received (block 550) from the user. Application program 106 updates one or more application profiles 110 (block 552). If there are one or more update errors (block 554) to application profile 110, application program 106 sends a message (block 556) to the user and the user can modify the changes (block 550) as appropriate. If there are no update errors (block 554), application program 106 sends a report of successful changes (block 558) to the user.

If the user identifies additional changes (block 560), those changes (block 550) are obtained from the user. If there are no additional changes (block 560), the activity is completed.

FIG. 19—Create Application Reports

Report requests and report parameters (block 600) are received from the user. Based on the requested report and the report parameters, application program 106 obtains appropriate information for the report (block 602) from one or more application profiles 110 and from one or more application databases 108. Application program 106 formats this information (block 602) for one or more reports.

If there are one or more errors (block 604), application program 106 sends an error message (block 606) to the user. The user refines the report request (block 600). If there are no errors (block 604), application program 106 sends application reports 114 (block 608) to the user.

If the user requires (block 610) additional application reports 114, the user identifies the report requests (block 600). If there are no additional reports required (block 610), the activity is completed.

Operation

This section contains an example of system operation from the viewpoint of a system user. In this example the user interacts with the system using a telephone, FIG. 8, as user device 104. As described in a previous section, the system uses telephone speaker 120 and telephone keypad 122 to provide functionality for the user to interact with the system through user interface 116.

In this example assume that a department meeting was held using telephone communication to include local and dispersed members of the department. The department meeting was recorded using the telephone for access to the system as well as communication during the department meeting. The department manager instructed the system through user interface 116 consisting of telephone keypad 122 and telephone speaker 120. Telephone microphone 118 was used to record the meeting. The meeting included a base meeting, recorded as sound stream 50, and three main topics. Each of the three topics was recorded as sound annotations 54. Of course, sound annotations 54 were identified in sound stream 50 at the relevant position in sound stream 50 by sound glyphs 52. Sound glyphs 52, in this example, are a 0.5 second recording of "middle C" being played on a piano. The recording of sound stream 50 of the department meeting was cataloged in the system with the identifier "56020110". This is "56" for the number of the department and the other numbers represent the date of the meeting, Jan. 10, 2002. Once sound stream 50, "56020110", was cataloged into the system, it is available to authorized personnel. Also, a voice message is sent to each member of the department notifying them of the recording of the department meeting and the identification number by which it can be accessed.

Assume that a member of the department was returning from a business trip and could not attend the department meeting. When he returned to work, he listened to the voice mail containing the identification number of sound stream 50 which contains the recording of the department meeting. The department member chooses to listen to the recording to determine if anything of interest was discussed and whether he has any work assignments from the meeting.

Using a telephone, as shown in FIG. 8, the department member (the user) dials the system. The system asks the caller to sign-on to the system by identifying himself. In this example the user does this by entering his numeric password, followed by the key # to identify the end of the password, using the keys on the telephone keypad 122. The system recognizes the user's password and he is granted access to the system.

The user is now at the initial stage of the system. In this example the keys on telephone keypad 122 have the following usage for the initial stage:

a) Key 1—Cataloging and storing existing sound in the system.
b) Key 2—Directly creating sound stream 50 in the system.
c) Key 3—Locating sound stream 50.
d) Key 4—Playback of sound stream 50 and sound glyphs 52 with associated sound annotations 54.
e) Key 5—Creating sound glyphs and associated sound annotations 54.
f) Key 6—Create map graphic 112.
g) Key 7—Create application reports 114.
h) Key 8—Update administrative information, for example, change a password.
i) Key *—Help, for example, review what each key currently represents.
j) Key 0—Sign-off from the system.

Because the user wants to locate previously recorded sound stream 50, he pushes key 3. The system asks the user to enter the identification number of sound stream 50. The user enters "56020110". This information is used by the system to locate desired sound stream 50. The system verifies that the user has proper authorization and tells him that he has access to specified sound steam 50, the recording of the department meeting.

Because the user wants to listen to the recording of the department meeting to which he has gained access, he pushes key 4. He is now at the playback stage of the system. In this example the keys on telephone keypad 122 have the following usage:

a) Key 1—skip backward 3 seconds. While listening to sound stream 50, sound glyph 52, or sound annotation 54, the user can position the recording so the user will hear the last 3 seconds again by pushing key 1.
b) Key 2—start or resume listening to the sound recording. The user can either start listening to or resume listening to sound stream 50, sound glyph 52, or sound annotation 54 by pushing key 2. Also, when the user is given a choice of whether to listen to, again listen to, or skip listening to sound annotation 54, the user can choose to listen to sound annotation 54 by pushing key 2.
c) Key 3—skip forward 3 seconds. While listening to sound stream 50, sound glyph 52, or sound annotation 54, the user can position the recording so the user will advance 3 seconds in the recording by pushing key 3.
d) Key 4—skip to next sound glyph 52. While listening to sound stream 50 or sound annotation 54, the user can advance the recording to the next sound glyph 52 or the end of the current sound recording, whichever occurs first, by pushing key 4.
e) Key 5—stop or pause listening to the sound recording. While listening to sound stream 50, sound glyph 52, or sound annotation 54, the user can stop or pause listening to the recording by pushing key 5. Also, when the user is given the choice of whether to listen to, listen again to, or skip listening to sound annotation 54, the user can choose not to listen to sound annotation 54 by pushing key 5.
f) Key *—help. By pushing key * the system will review what is currently happening with the system and what can currently be accomplished by pushing any of the keys.
g) Key 0— end. When the user finishes listening to sound stream 50 and sound glyphs 52 along with associated sound annotations 54, the user can end the playback activity by pushing key 0.

The user starts listening to the department meeting recording—sound stream 50—by pushing key 2. In this example the first part of the recording includes who is present at the meeting, the objectives of the meeting, and the agenda. When the introductory information is completed, the user hears the introduction of the first topic which is followed by sound glyph 52. The recording pauses and the user decides whether the first topic, sound annotation 54 is of interest to him. It is not and he therefore pushes key 5 to skip listening to sound annotation 54. With the pushing of key 5 sound stream 50 continues.

The user listens to the introduction of the second topic of the department meeting, which is again followed by sound glyph 52. The recording pauses and the user decides whether the second topic, sound annotation 54, is of interest to him. It is of interest to him and he therefore pushes key 2 to listen to sound annotation 54. After listening to part of sound annotation 54, the user decides the topic is not of interest to him. He therefore pushes key 4. Pushing key 4 skips ahead in the recording looking for sound glyph 52. Because there are no sound glyphs 52 in sound annotation 54, the end of sound annotation 54 is reached Because the end of sound annotation 54 is reached, the system pauses. The user has the option of listening to the second topic, sound annotation 54, again. If the user wants to listen to it again, he pushes key 2. Because the user does not want to listen to the second topic again, he pushes key 5. Sound stream 50 continues.

The user listens to the introduction of the third topic of the department meeting, which is again followed by sound glyph 52. The recording pauses and the user decides whether the third topic, sound annotation 54, is of interest to him. It is of interest to him and he therefore pushes key 2 to listen to sound annotation 54. While listening to the third department meeting topic, the user realizes he has been asked to take some action regarding the topic. Because he wants to hear about his task again, he pushes key 1 several times to review the last part of the recording. The user can repeat listening to his assignment as times as necessary to insure he understands. After reviewing what is being asked of him, the user listens to the rest of the third topic, sound annotation 54. When the end of the third topic is completed, the system pauses. The user has the option of listening to the third topic, sound annotation 54 again. If the user wants to listen to it again, he pushes key 2. Because the user does not want to listen to the third topic again, he pushes key 5. Sound stream 50 continues.

The user listens to the rest of the department meeting recording. When the recording, sound stream 50, completes, the system pauses. If the user wants to listen to the department meeting recording, sound stream 50, again, he pushes key 2 to restart the recording. Because the user has completed listening to the department meeting recording, he pushes key 0. This returns the user to the initial stage of the system which is described above. The user can choose to accomplish other activities with the system or if he is through, he pushes key 0 and he is logged off of the system.

The above description includes an example of system operation for locating and playing back a recording. The other system capabilities operate in a similar fashion.

DESCRIPTION AND OPERATION OF ALTERNATIVE EMBODIMENTS

There are several alternative embodiments possible, some of which are described in this section.

Unidirectional Communication

Communication includes conveying information from people, groups, systems, and/or machines to other people, groups, systems, and/or machines. Unidirectional communication means that communication is taking place in only one direction. The SOS-A system supports unidirectional communication. The people, groups, systems, and/or machines create the sound streams and sound glyphs with the associated sound annotations. The users create the communication and can utilize all of the capabilities of the SOS-A system. External sound can be cataloged into the SOS-A system as sound streams. The sound glyphs and associated sound annotation can also be created directly in the SOS-A system. The sound streams and sound glyphs with the associated sound annotations can be distributed to or made available to the designated people, groups, systems, and/or machines to which the communication is intended. Because this is unidirectional communication, people, groups, systems, and/or machines, to which the communication is intended would only utilize the locate and playback capabilities of the SOS-A system. Some examples of one-way SOS-A system communication are as follows:
  a) communication to an insurance claims department with updated procedures for processing insurance claims;
  b) communication to all company employees discussing financial performance of the company for the last year;
  c) advertising to customers or prospective clients;
  d) response to a query from a current or potential customer, for example, a response of hotels, along with the pertinent information, that are within 5 miles of an airport;
  e) communication to a client with an update of information about stocks included in their portfolio; and
  f) communication to a client with expert comments concerning a recent speech from a high-level government official.

The communication can be accessed and played back, as appropriate, by the recipients, for example immediately, during work hours, over lunch, while communicating to or from work, at home in the evening, etc.

The unidirectional SOS-A system communication can be distributed or made available without charge, for example by a headquarters group in a company to their employees or can be offered for a fee or as a subscription service, for example over the Internet to clients.

Bidirectional Communication and Collaboration

Bidirectional communication and/or collaboration are also desirable, and authorized participants may have the capability of creating sound streams and sound glyphs with the associated sound annotations. Authorized participants, if designated by the application profile, may have the ability to utilize the catalog, create, and playback capabilities of the SOS-A system. Some examples of bidirectional communication and/or collaboration, where answers, comments, or additional information are expected, are the following:
  a) a manager's description of a customer situation and requested action by an employee to support that customer;
  b) a recording of a department meeting made available to employees who were traveling and not available for the meeting;
  c) requesting comments on a business or legal problem;
  d) creating a business plan for an unannounced product; and
  e) designing a wing for a new airplane being developed.

Computer Generated Sound Streams and Sound Annotations

Sound streams and sound glyphs with the associated sound annotations can be created by either of two methods or a combination of both: 1) by humans interacting with the SOS-A system, and/or 2) by a system independent of any direct human intervention.

Creating sound streams and sound glyphs with the associated sound annotations through human intervention has been previously discussed. However, sound streams and sound glyphs with the associated sound annotations can also be created directly by the SOS-A system without direct human intervention. For example, a client asks a stock broker for notification if an identified stock falls by 10% or more in a single trading day. Computer systems can identify when this happens and the SOS-A system can create sound streams, sound glyphs and sound annotations which can be automatically routed to the client, for example by creating a voice-mail message. Instead of a long, continuous message detailing the situation and detailed analysis concerning the stocks, the message can contain a simple summary sound stream that includes sound glyphs pointing to sound annotations, for each of the stocks of interest. Of course, each of these sound annotations can also include nested sound annotations containing greater levels of details and/or analysis. Optionally, the client can select to listen to any or all of the sound annotations for the stocks of interest.

Some examples of computer-generated sound streams and sound annotations are as follows:
  a) Due to a recent hire, personnel costs for the Accounts Payable Department exceed X % of company revenue. As a result of the notification, the Accounts Payable Department can develop a plan to reduce their personnel costs.
  b) Customers between the ages of 18–24 have exceeded purchases for any other age grouping for product "xyz". With this knowledge, a marketing campaign for product "xyz" can be developed to target potential customers with ages between 18 and 24.
  c) An inaudible sound, that usually leads to engine failure within 24 hours, has been detected for a turbine. As a result of the notification, the failing engine can be replaced and maintenance scheduled to fix the problem.
  d) The average thickness of the rolled steel has exceeded 0.005 inch on production line 3. With this knowledge, the thickness of the rolled steel in production line 3 can be adjusted to bring it back within tolerance.

Triggers

Triggers are predefined criteria (events and/or conditions), stored in a database, that can cause automated processing based upon the predefined criteria. The criteria can include one or more events and/or conditions from the past, the present, or when they occur in the future. The automated processing includes creation 1) of sound streams, sound glyphs, and the associated sound annotations, and/or 2) signals for desired action or attention such as adjusting a valve, changing the tolerance on a machine, turning on a light, etc. Triggers expand the usage and effectiveness of the SOS-A technology.

An example is included in the previous section "Computer Generated Sound Streams and Sound Annotations". Automated processing, driven by the appropriate trigger, is to analyze whether the price of a stock decreases by 10% in a single trading day. Of course the trigger can be any condition that can be defined and used to process data. The criteria describing the triggers are stored in the application profile. The use of triggers can apply to data that is stored in the SOS-A application database and to data that is not included in the SOS-A application database. The concept of triggers are not new to SOS-A technology; trigger processing, for example, is included in several commercially available database products.

Another example of triggers and computer generation of sound streams and sound annotations is the situation where the SOS-A system can search a sound stream looking for predefined keywords; for example, the names of the selected companies whose stocks are traded on any of the major USA stock exchanges. If the names of any of these companies are included in a sound stream, a sound glyph for that company can be included in the sound stream at the point the companies name is mentioned, and an associated sound annotation can be created and include the value of the company's stock and a summary of its financial health. The sound annotation can itself contain additional sound annotations which could provide additional information and analysis, and the user can select to listen to any or all of the sound annotations if so desired.

Examples, that are identified in the preceding section "Computer Generated Sound Streams and Sound Annotations" are also examples of the use of triggers.

Off-line Operations

If the user device includes stored program, compute, and local storage capability, the SOS-A system processing can be accomplished off-line; that is, processing may be conducted without being connected to the communication facility. PDAs, laptop computers, and desktop computers are examples of user devices that include this capability. To do the off-line processing a subset of the application program capability must reside at the user device. For example, a sound stream is downloaded from the SOS-A application database and is stored in the user device. While the user device is off-line (not connected to the communication facility), the sound stream can be played. If the user decides to add sound annotations, he/she does so and stores them on the local storage. When the user device is next on-line (connected to the communication facility), the sound stream and the sound glyphs with the associated sound annotations are uploaded by the application program and are cataloged and stored in the application database.

Audible and Inaudible Sound

As previously identified, the SOS-A system supports audible and inaudible sound. There are three scenarios concerning audible and inaudible sound: 1) inclusion of only audible sound, 2) inclusion of both audible and inaudible sound, and 3) inclusion of only inaudible sound. Examples of each are:
 a) Only audible sound—Examples of this have been previously discussed.
 b) Both audible and inaudible sound and only inaudible sound—For both of these examples the inaudible sound is monitored and analyzed by devices and/or systems designed for that purpose. The devices and/or systems can detect sound patterns and/or frequencies in the inaudible sound ranges which are or might be of interest. The devices and/or systems also have the capability of creating inaudible sound streams, sound glyphs, and sound annotations. The other two scenarios, both audible and inaudible sound, and only inaudible sound, are discussed below:

Both audible and inaudible sound—An example of this is analysis of the flight data and/or voice recorders of a commercial airplane. The recorders can contain human speech, for example by the pilot and copilot, as well as sound outside of the sound spectrum of a human ear, for example problems such as abnormal engine noise, air movement (wind), explosions, etc. The recorded sound from the flight data and/or voice recorders can be cataloged into the SOS-A system and appropriate sound glyphs with the associated sound annotations can be created, depending upon audible and inaudible sound that was found on the recorders. The inaudible sound may then be identified and analyzed with machines and/or systems supporting this capability. Another example concerns the Navy and submarine operations. The Navy can use personnel, and machines and/or systems to "listen" for audible and inaudible sounds that may come from other submarines, torpedoes, etc. Sound streams and sound glyphs with the associated sound annotations can be created based on both the audible and inaudible sound from another submarine, torpedoes, etc.

Only inaudible sound—An example involves monitoring jet engines where detection of certain inaudible sounds can be crucial for predicting engine component problems or failures. The inaudible sound can be captured and analyzed by the SOS-A system, for example through the use of triggers. Inaudible sound glyphs and the associated sound annotations can be created also using inaudible sound. These SOS-A sound structures can be cataloged and stored for subsequent analysis. For example the analysis might include alerts when maintenance is needed, design changes that are needed, etc.

Integration of SOS-A technology with the Internet

Although the Internet is not a pre-requisite, SOS-A capability can be made available to users through the Internet. As used in this section, the term "Internet" is very broad and includes all aspects of it, for example, the world-wide-web; browser; structure for applications, appletts, plug-ins, download, and upload, and protocols such as HTML, VOIP, etc. SOS-A technology can be implemented using the facilities, structure, and protocols that are offered through integration with the Internet.

One example of integration with the Internet is the situation where users can access sound streams and sound glyphs with the associated sound annotations through the Internet and they can be processed directly with the Internet using sound and communication facility available with the Internet. For example, a web site can be accessed on the Internet. When a user selects a desired option, the SOS-A system is engaged and a sound streams and sound glyphs with the associated sound annotations can be created, routed, or played back using the SOS-A user device, for example, a personal computer. The SOS-A user interface is provided through the Internet in association with the user device. In this manner SOS-A unidirectional and bidirectional communication can be supported through integration with the Internet.

Another example of integration with the Internet is sound streams and sound glyphs with the associated sound annotations can be downloaded from the Internet to the SOS-A user device, for example, a personal computer or can be uploaded from the SOS-A user device, for example, a personal computer. As previously described, the SOS-A processing can be accomplished with the user device in off-line operations.

Integration of SOS-A Technology with Text, Pictures, Graphics, and Video

Through the user interface with the user device, the user is able to access the SOS-A capabilities. As previously defined, a display capability is optional for the user device. However, if the user device includes a display capability, the display capability can be utilized to provide information content rather than just the user interface capability. For example, while a user is listening to a sound stream, sound glyphs, and/or sound annotations, text, pictures, graphics, or video can be displayed on the display capability. The text, pictures, graphics, or video are keyed to the delivery of the sound, not the other way around. That is, text, pictures, graphics and videos are tied to sound streams, sound glyphs, and/or sound annotations; it is not sound streams, sound glyphs, or sound annotations tied to text, pictures graphics or videos. Some examples of integration of SOS-A technology with text, pictures, graphics, and/or video are:

a) a picture of the company president who is providing information to employees at the close of the financial year, and a picture of each of the vice-presidents who are providing information about their departments as the sound annotations are selected;

b) pictures of charts that are being used in a presentation;

c) text highlighting the subject of what is being played back;

d) a video showing a new claims process as it is being described; and e) a map graphic highlighting which sound stream, sound glyph, or sound annotation is being played back.

CONCLUSION, RAMIFICATIONS, AND SCOPE OF INVENTION

Thus the reader will see that our SOS-A system provides highly desirable capabilities to improve communication and/or collaboration that can benefit businesses, governments, groups, and/or individuals. Furthermore, the SOS-A system has the following additional advantages.

a) It improves the speed, timeliness, quality, efficiency, and completeness of communication and/or collaboration.

b) It facilitates the creation, distribution and management of sound streams, sound glyphs, and sound annotations.

c) It enables archiving and retrieval of communication and/or collaboration information.

d) It provides linking of a sound annotation to a specific location, with a sound glyph, in the relevant sound stream.

e) It provides selective playback of sound annotations.

f) It provides system tailoring and administration to meet diverse communication and/or collaboration needs.

g) It provides support for all sound either within or without the human audible range.

h) It provides for unlimited levels of sound annotations.

i) It provides triggers for execution of system actions based on tests for events and/or conditions.

j) It utilizes a wide range of wire or wireless user devices, for example telephones, PCs, and PDAs.

k) It encourages usage of other technology to enhance the capabilities of the SOS-A system.

While the above description contains many specificities, these should not be construed as limitations on the scope of the invention, but rather as an exemplification of the preferred and alternative embodiments thereof. Many other variations are possible, some of which are discussed below.

Sound Glyph Implementation

The preferred and alternative embodiments define sound glyphs being inserted in sound streams. There are multiple ways this can be accomplished: 1) the sound glyph can be inserted directly in the sound stream, 2) the sound glyph can be inserted in a parallel sound channel that is synchronized with the channel containing the sound stream, 3) the sound glyph can be inserted as overlay sound on the sound stream, or 4) any other method of capturing a sound glyph that keeps it in synchronization with the sound stream can be used.

Distribution of Sound Streams and Sound Glyphs with Associated Sound Annotations Distribution can be greatly expanded beyond the simple distribution that is defined in the preferred embodiment. For example, the person doing the distribution can identify whether action and date/time for the action is required regarding the distribution. The action, along with the date/time requirements, can be tracked, monitored, and reported. This tracking, monitoring, and reporting can be input to or incorporated with a simple to complex project management system. Some examples of expanded distribution are the following:

a) predefined distribution lists including the capability for adding to and subtracting from the predefined distribution lists;

b) nested distribution lists;

c) selection whether sound streams and sound glyphs with the associated sound annotations are actually distributed to the recipients or whether the distribution is notification to the recipient of where and how to gain access to the sound streams and sound glyphs with the associated sound annotations;

d) conditional distribution based on triggers, events or criteria which can be in the past, present, or in the future; and e) distribution based on security.

Database Capabilities

SOS-A capabilities can be extended by taking advantage of database product functionality. Some examples of database product functionality are:

a) storing and managing sound streams and sound glyphs and any associated sound annotations;

b) security that is provided with the database product;

c) logical database management, including database replication, over a diverse, local and/or remote computer complex;

d) trigger capability inherent in the database product;

e) querying and reporting capability inherent in the database product;

f) check-in and check-out capabilities (if a sound stream or sound annotation is checked-out for off-line processing, someone else can not make changes to it); and g) prevention of multiple people updating a sound stream or sound annotation at the same time.

Application and/or System Administration and Tailoring

The SOS-A system can be tailored to meet the specific needs of a company, set of users, or a specific user, can be expanded beyond that which has been identified in the preferred and alternative embodiments of this invention. As previously identified, the definition of the tailoring is stored in the application profile. Some examples of the extended tailoring are as follows:

a) application attributes for example a limit to the number of levels of sound annotations that are allowed, limitation to the length of sound annotations;
b) definition of the content for a sound header; and
c) identification of default sound glyphs for departments, projects, and/or users.

Security

Security can be greatly expanded beyond the simple password security that is defined in the preferred embodiment. Support for this extended security can be included in an implementation of the SOS-A system. As previously stated, security is defined and stored in the application profile. Some examples of expanded security are as follows:
a) security can be defined at a company-wide level with everyone in the company having the same level of security;
b) security can be defined at a department and/or project level with everyone in or assigned to a department and/or project having the same level of security;
c) security can be defined at a personnel level with each person having their own level of security;
d) security can be defined differently for external company partners and/or vendors from security for company personnel;
e) security can be enhanced by verifying the potential SOS-A user is authorized to have access by comparing the user's voice to a stored voice print for the user (refer to the section on "Related Technology");
f) security can be defined on a need-to-know basis based on topic, author, or other criteria; and
g) security can provide granularity for listening authority versus creation authority versus reporting authority.

Application Reports

Application reports vary from rather simple to a rich set of reports to meet diverse user needs. Reports can be available centrally or locally, through SOS-A user devices or other devices such as printers, and either available as text and graphics or as sound. Application reports can take advantage of database product capabilities (searching, querying, etc.) that may be used in conjunction with the SOS-A system. Some examples of application reports are as follows:
a) reports of cataloged sound streams, sound glyphs with the associated sound annotations which can be sorted, for example by author, by topic, by date, etc.;
b) reporting on and analysis of application usage;
c) reporting on actions, activities, and/or events, and the status of those actions, activities, and/or events;
d) reporting on application profile contents including for example system parameters, security definition, assigned personnel, etc.; and content changes including by whom and date/time of the change; and
e) reporting on the distribution and response of sound streams, sound glyphs and the associated sound annotations.

"Sound Art" with Sound Glyphs

"Sound art" is previously captured sound that can be used with the creation of sound glyphs. Sound art can be thought of as similar to "clip art" that is used with text/graphics applications; however, the sound art is sound rather than text and/or graphics. A specific sound can be defined to represent, for example, a department in a company. Examples of sound art are: the first notes of Beethoven's fifth symphony, three beeps, a car crashing, "charge" played on a trumpet, an airplane passing overhead, etc. Sound art simplifies the creation of sound glyphs and/or sound annotations.

Related Technology

There is related technology that can be used with SOS-A technology but is not part of the definition of SOS-A technology. Some examples of related technology are:

Encryption—sound streams, sound glyphs, and sound annotations can be distributed over unsecured telephone lines or over unsecured wireless capabilities. For security of the SOS-A system, encryption of the sound may be needed. There are other technologies available providing encryption capability and are therefore not directly included in the SOS-A definition.

Translation of Speech To/From Text—Translation can be considered from two aspects: 1) text to speech (a sound stream) and 2) speech (a sound stream) to text. Both of these translations can be very useful with SOS-A technology. Although usage of both of these translations are helpful to SOS-A technology, there are other technologies available providing this capability and are therefore not directly included in the SOS-A definition.

Text can be translated to speech which of course can be cataloged as a sound stream. Once the text has been translated to a sound stream and cataloged in the SOS-A system, it can be manipulated within the SOS-A system. For example sound glyphs and sound annotations can be added. An example of the usage of text to speech translation is a person on a trip could listen to the translation of their text e-mail as a sound stream. Because the translated e-mail can be cataloged as a sound stream, it can be dealt with using SOS-A capabilities as with any other sound stream. Text, which includes text annotations, can be translated to SOS-A sound streams with included sound glyphs which are linked to sound annotations.

Speech, which can be a sound stream, can be translated to text. Once the speech has been translated to text, it can be dealt with using any text manipulation capabilities. An example of the usage of speech to text translation is archival back up. It may be simpler or more desirable to archive text than to archive sound. SOS-A sound streams with sound glyphs linked to sound annotations can be translated to text which includes positional text annotations.

Identification of a SOS-A user using a voice print—Security is an important part of the SOS-A capability and security passwords have already been discussed. However, there is additional security technology that can be utilized with the SOS-A system. A positive identification of the user can be made by matching a speech print. The sample speech print can be stored in the application profile. This could be used in addition to or instead of password protection. Although usage of this technology is helpful to the SOS-A system, there are other technologies available providing this capability and are therefore not directly included in the SOS-A Definition.

Accordingly, the scope of the invention should be determined not by the embodiments illustrated, but by the appended claims and their legal equivalents.

What is claimed is:

1. A method of adding a sound annotation to a recorded stream of sound, comprising:
   a. providing a recorded stream of sound,
   b. inserting a predetermined sound marker into said recorded stream of sound, said predetermined sound marker being distinguishable from the sound in said recorded stream,
   c. providing a recorded sound annotation, d. providing a user-operable link between said predetermined sound marker and said recorded sound annotation so that when said predetermined sound marker is reached during playback of said recorded stream of sound, a user can elect to hear said recorded sound annotation, whereby a user can elect to listen to only relevant or desired recorded sound annotations, thereby increasing the likelihood that a user will listen to the recorded stream of sound and relevant or desired sound annotations, thereby improving communication and collaboration.

2. The method of claim 1 wherein inserting said predetermined sound marker into said recorded stream of sound is done so that said predetermined sound marker is in a position that corresponds to a place in said recorded stream of sound to which said sound annotation is connected.

3. The method of claim 1 wherein said sound annotation contains information or content relevant to the location of said sound marker in the said recorded stream of sound.

4. The method of claim 1, further including creating and playing back said sound information.

5. The method of claim 1, further including providing security control for distributing said sound information or granting access to said sound information.

6. The method of claim 1, further including providing a second sound annotation, linking said second annotation of sound with said first-named sound annotation, thus nesting said sound annotations.

7. The method of claim 1 wherein said recorded stream of sound, said sound markers, and recorded sound annotations consists of sound selected from the group consisting of sounds which are below, within, and above the range of sound frequencies which can be heard by the human ear.

8. A system for distributing or providing access to recorded sound information to at least one user, comprising:
   a. a computer system for storing, managing, and distributing said sound information, said computer system comprising:
      1) a recorded stream of sound,
      2) at least one recorded marker of sound, comprising a predetermined sound inserted into said recorded stream of sound, said predetermined sound being distinguishable from other sound in said recorded stream of sound,
      3) a separately created and recorded sound annotation, said marker of sound providing a user-operable connection or link to said sound annotation so that when said marker of sound is reached during playback of said stream of sound, a user can elect to hear said recorded sound annotation,
   b. a device for creating, selecting, and playing back said sound information and,
   c. a communication facility for interconnecting said device and said computer system,
   whereby a user can elect to listen to only relevant or desired recorded sound annotations, thereby increasing the likelihood that a user will listen to the recorded stream of sound and relevant or desired sound annotations, thereby improving communication and collaboration.

9. The system of claim 8, further including means for creating, selecting, and playing back said sound information.

10. The system of claim 8 wherein inserting said marker of sound into said recorded stream of sound is done so that marker of sound is in a position that corresponds to a place in said recorded stream of sound to which said sound annotation is connected.

11. The system of claim 8 wherein said sound annotation contains information or content relevant to the location of said sound marker in the said recorded stream of sound.

12. The system of claim 8, further including means for providing security access control for creating, selecting, and playing back said sound information.

13. The system of claim 8, further including distributing or providing access to said sound information.

14. The system of claim 8, further including means for generating said sound information by said computer system according to predefined logic or conditions which are stored in said computer system, or generating signals for action or attention based on content of said sound information according to predefined logic or conditions which are stored in said computer system.

15. The system of claim 8, further including means for tailoring said computer system execution through a plurality of user-defined operational parameters which are stored in said computer system.

16. A system for augmenting sound information, comprising:
   a. means for recording a stream of sound,
   b. means for inserting at least one marker or glyph into said stream of sound, said marker or glyph having a predetermined frequency,
   c. means of recording at least one sound annotation,
   d. means for associating said annotation of sound with said marker or glyph so that when said stream of sound is played and said marker or glyph is reached, said sound annotation can be selectively played,
   whereby a user can elect to listen to only relevant or desired recorded sound annotations, thereby increasing the likelihood that a user will listen to the recorded stream of sound and relevant or desired sound annotations, thereby improving communication and collaboration.

17. The system of claim 16, further including means for inserting said marker of sound into said recorded stream of sound is done so that marker of sound is in a position that corresponds to a place in said recorded steam of sound to which said sound annotation is connected.

18. The system of claim 16, further including means for containing information or content relevant to said recorded stream of sound.

19. The system of claim 16, further including means for providing security access control for creating, selecting, and playing back said sound information.

20. The system of claim 16, further including means for distributing or providing access to said sound information.

21. The system of claim 16, further including means for providing a second sound annotation, linking said second sound annotation with said first-named sound annotation, thus nesting said sound annotations.

22. A system for augmenting sound information, comprising:
   a. a sound stream recorder for recording a stream of sound,
   b. a glyph inserter for inserting at least one marker of sound or glyph of sound into said stream of sound, said marker or glyph having a sound frequency,
   c. a sound annotation recorder for recording at least one sound annotation, and,
   d. a circuit for associating said annotation of sound with said marker or glyph so that when said stream of sound is played and said glyph is reached, said annotation of sound can be selectively played, whereby a user can elect to listen to only relevant or desired recorded sound annotations, thereby increasing the likelihood that a user will listen to the recorded stream of sound and relevant or desired sound annotations, thereby improving communication and collaboration.

23. The system of claim 22 wherein said glyph inserter for inserting said glyph of sound into said recorded stream of sound is arranged so that said glyph of sound is inserted in a position that corresponds to a place in said recorded stream of sound to which said sound annotation is connected.

24. The system of claim 22 wherein said sound annotation contains information or content relevant to the location of said glyph of sound in the said recorded stream of sound.

25. The system of claim 22, further including means for providing security access control for creating, selecting, and playing back said sound information.

26. The system of claim 22, further including means for distributing and providing access of said sound information.

27. The system of claim 22, further including means for generating said sound information by said system according to predefined logic or conditions which are stored in said computer system, or generating signals for action or attention based on content of said sound information according to predefined logic or content of said sound information according to predefined logic or conditions which are stored in said system.

* * * * *